(12) United States Patent
Kumar et al.

(10) Patent No.: US 11,383,597 B2
(45) Date of Patent: Jul. 12, 2022

(54) ELECTRIC DRIVE UNIT ASSEMBLY

(71) Applicant: DANA HEAVY VEHICLE SYSTEMS GROUP, LLC, Maumee, OH (US)

(72) Inventors: Krishna Kumar, West Bloomfield, MI (US); William F. Waltz, Toledo, OH (US)

(73) Assignee: DANA HEAVY VEHICLE SYSTEMS GROUP, LLC, Maumee, OH (US)

(*) Notice: Subject to any disclaimer, the term of this patent is extended or adjusted under 35 U.S.C. 154(b) by 306 days.

(21) Appl. No.: 16/500,830

(22) PCT Filed: Jun. 1, 2018

(86) PCT No.: PCT/US2018/035600
§ 371 (c)(1),
(2) Date: Oct. 4, 2019

(87) PCT Pub. No.: WO2018/222993
PCT Pub. Date: Dec. 6, 2018

(65) Prior Publication Data
US 2020/0122572 A1    Apr. 23, 2020

Related U.S. Application Data

(60) Provisional application No. 62/514,106, filed on Jun. 2, 2017.

(51) Int. Cl.
*B60K 17/04* (2006.01)
*B60K 1/02* (2006.01)
(Continued)

(52) U.S. Cl.
CPC ............. *B60K 17/046* (2013.01); *B60K 1/02* (2013.01); *B60K 7/0007* (2013.01); *B60K 17/02* (2013.01);
(Continued)

(58) Field of Classification Search
CPC ...... B60K 17/046; B60K 1/02; B60K 7/0007; B60K 17/02; B60K 17/16; B60K 17/26;
(Continued)

(56) References Cited

U.S. PATENT DOCUMENTS 5,620,387 A    4/1997  Janiszewski
9,156,348 B1 * 10/2015  Swales .................. B60K 17/16
(Continued)

FOREIGN PATENT DOCUMENTS

EP    3222455 A2 *  9/2017 ............. F16H 3/728
FR    2976526 A1    12/2012
WO    WO-2016156566 A1 * 10/2016 ......... F16H 37/0813

OTHER PUBLICATIONS

ISA European Patent Office, International Search Report Issued in Application No. PCT/US2018/035600, dated Sep. 6, 2018, WIPO, 4 pages.
(Continued)

*Primary Examiner* — Justin Holmes
(74) *Attorney, Agent, or Firm* — McCoy Russell LLP

(57) ABSTRACT

A drive unit assembly. The drive unit assembly includes one or more first motors drivingly connected to at least a first end portion of a first shaft. A planetary gear assembly having a sun gear, one or more planetary gears, a ring gear and a carrier. At least a portion of the sun gear is drivingly connected to at least a portion of a second end portion of the first shaft and the carrier is drivingly connected to at least a portion of the one or more planetary gears. A differential input member is drivingly connected to at least a portion of the carrier and a differential assembly. At least a portion of a first axle half shaft is drivingly connected to the differential and is disposed within a hollow portion of said first shaft and a second axle half shaft is drivingly connected to the differential assembly.

18 Claims, 16 Drawing Sheets

(51) Int. Cl.
*B60K 7/00* (2006.01)
*B60K 17/02* (2006.01)
*B60K 17/16* (2006.01)
*B60K 17/26* (2006.01)
*F16H 37/04* (2006.01)
*F16H 55/17* (2006.01)
*F16H 57/08* (2006.01)
*H02K 7/116* (2006.01)
*F16D 3/06* (2006.01)

(52) U.S. Cl.
CPC .............. *B60K 17/16* (2013.01); *B60K 17/26* (2013.01); *F16H 37/042* (2013.01); *F16H 55/17* (2013.01); *F16H 57/08* (2013.01); *H02K 7/116* (2013.01); *B60K 2007/0069* (2013.01); *B60K 2007/0092* (2013.01); *F16D 3/06* (2013.01); *F16H 37/04* (2013.01); *F16H 2055/176* (2013.01); *F16H 2200/0056* (2013.01); *F16H 2200/0065* (2013.01); *F16H 2200/0073* (2013.01)

(58) Field of Classification Search
CPC .... B60K 2007/0092; B60K 2007/0069; B60K 2001/001; B60K 17/043; B60K 17/08; B60K 17/20; B60K 17/00; B60K 1/00; B60K 7/00; B60K 17/04; F16H 37/042; F16H 55/17; F16H 57/08; F16H 37/04; F16H 2055/176; F16H 2200/0056; F16H 2200/0065; F16H 2200/0073; H02K 7/116; F16D 3/06
See application file for complete search history.

(56) References Cited

U.S. PATENT DOCUMENTS

| 9,222,565 | B2* | 12/2015 | Pichler | F16H 48/22 |
| 2002/0019284 | A1* | 2/2002 | Aikawa | B60K 6/547 475/150 |
| 2009/0111641 | A1 | 4/2009 | Kim et al. | |
| 2015/0192193 | A1 | 7/2015 | Ichikawa et al. | |
| 2016/0025200 | A1 | 6/2016 | Petersen et al. | |
| 2017/0261082 | A1* | 9/2017 | Pritchard | B60K 7/0007 |

OTHER PUBLICATIONS

ISA European Patent Office, Written Opinion of the International Searching Authority Issued in Application No. PCT/US2018/035600, WIPO, 7 pages.

* cited by examiner

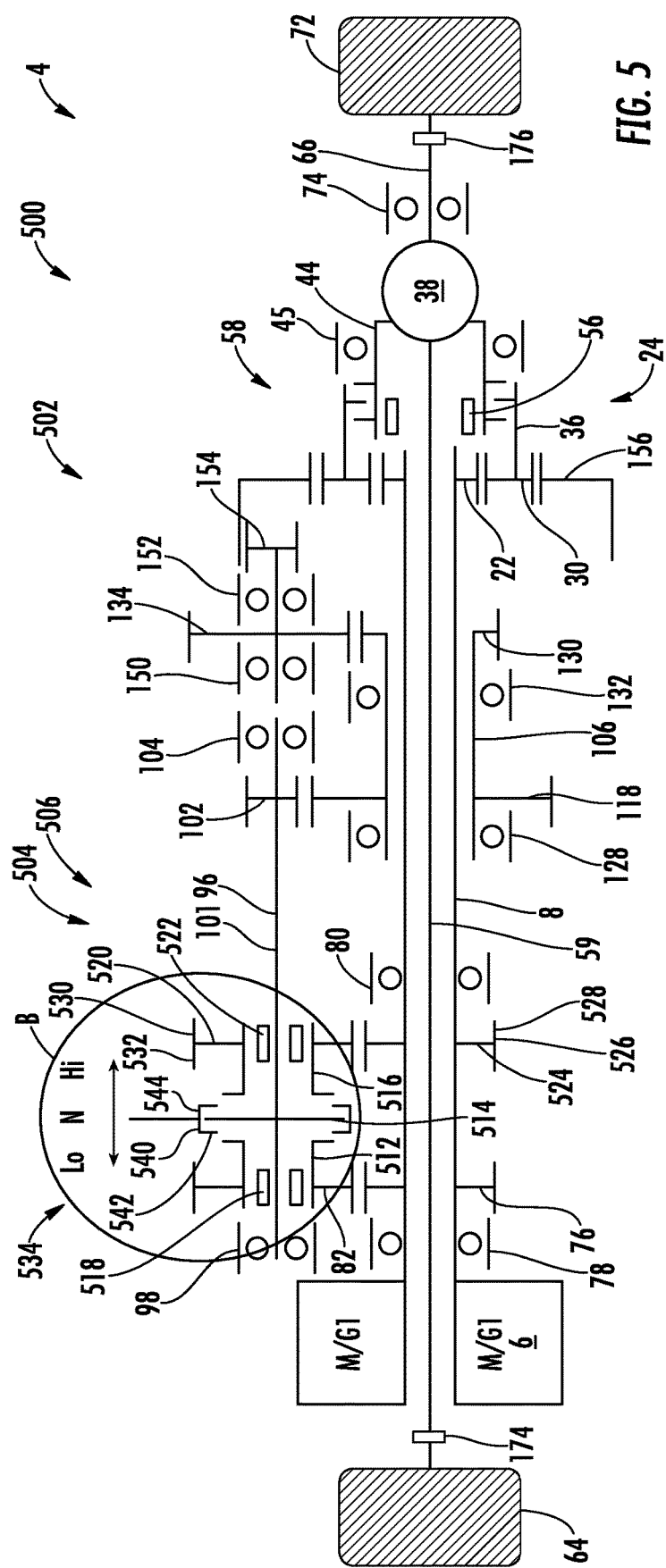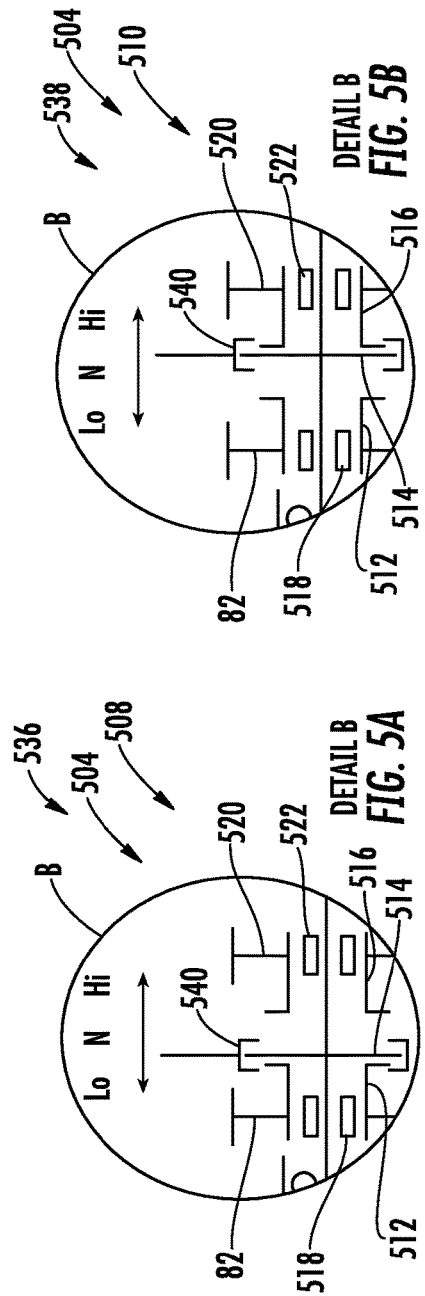

ELECTRIC DRIVE UNIT ASSEMBLY

CROSS-REFERENCE TO RELATED APPLICATIONS

The present application claims the benefit to U.S. Provisional Patent Application No. 62/514,106 filed on Jun. 2, 2017, which are incorporated herein by reference in their entirety.

FIELD OF THE DISCLOSURE

The present disclosure related to an electric drive unit assembly for use in a vehicle.

BACKGROUND OF THE DISCLOSURE

Hybrid and electric vehicles are gaining increasing popularity and acceptance due to the rising fuel costs and more stringent emission regulations imposed by the government in an effort to reduce carbon emissions and greenhouse gases. Conventional hybrid vehicles include the use of an internal combustion engine and an electric motor to provide rotational power to the wheels of a vehicle. In contrast, conventional electric vehicles only include the use on an electric motor to provide rotational power to the wheels of the vehicle.

It would therefore be advantageous to develop an electric drive unit that is cost efficient and has superior packaging in vehicles that will be one the road and are currently on the road. Additionally, it would be advantageous to develop an electric drive unit having high transmission ratios.

SUMMARY OF THE DISCLOSURE

A drive unit assembly for use in a vehicle. The drive unit assembly includes one or more first motors drivingly connected to at least a first end portion of a first shaft. A planetary gear assembly having a sun gear, one or more planetary gears, a ring gear and a carrier. At least a portion of the sun gear is drivingly connected to at least a portion of a second end portion of the first shaft and the carrier is drivingly connected to at least a portion of the one or more planetary gears. A differential input member is drivingly connected to at least a portion of the carrier and a differential assembly. At least a portion of a first axle half shaft is drivingly connected to the differential and is disposed within a hollow portion of said first shaft and a second axle half shaft is drivingly connected to the differential assembly.

According to an aspect of the disclosure, the drive unit assembly may further include one or more first bearing assemblies that are interposed between the outer surface of the second end portion of the first shaft and an inner surface of the differential assembly input member.

According to any one of the previous aspects of the disclosure, the drive unit assembly may further include an axle connect and disconnect device. At least a portion of the axle connect and disconnect device may be integrally connected to the carrier of the planetary gear assembly and the differential input member. The axle connect and disconnect device may selectively connect and disconnect the differential assembly from driving engagement with the one or more motors of the drive unit assembly.

According to any one of the previous aspects of the disclosure, the ring gear of the drive unit assembly may have a first inner surface, a second inner surface and an outer surface. A first plurality of ring gear teeth may circumferentially extend from at least a portion of the first inner surface of the ring gear and a second plurality of ring gear teeth may circumferentially extend from at least a portion of the second inner surface of the ring gear. The second plurality of ring gear teeth may be meshingly engaged with a plurality of planetary gear teeth circumferentially extending from at least a portion of an outer surface of the one or more planetary gears.

According to any one of the previous aspects of the disclosure, the first inner surface of the ring gear may have a diameter that is greater than a diameter of the second inner surface of the ring gear.

According to any one of the previous aspects of the disclosure, the ring gear may have a first plurality of ring gear teeth circumferentially extending from at least a portion of the outer surface of the ring gear and a second plurality of ring gear teeth circumferentially extending from at least a portion of the inner surface of the ring gear.

According to any one of the previous aspects of the disclosure, drive unit assembly may include a second gear assembly including a first gear, a second gear, a third gear, a fourth gear, a fifth gear, a sixth gear, a seventh gear assembly, a second shaft, a third shaft and a fourth shaft. At least a portion of the first gear may be drivingly connected to at least a portion of the first shaft, at least a portion of the second and third gears may be drivingly connected to at least a portion of the second shaft, at least a portion of the fourth and fifth gears may be drivingly connected to at least a portion of the third shaft and at least a portion of the sixth and seventh gears may be drivingly connected to at least a portion of the fourth shaft. Additionally, at least a portion of the first gear may be drivingly connected to the second gear, at least a portion of the third gear may be drivingly connected to the fourth gear, at least a portion of the fifth gear may be drivingly connected to the sixth gear, and at least a portion of the seventh gear may be drivingly connected to the first plurality of ring gear teeth of the ring gear.

According to any one of the previous aspects of the disclosure, the drive unit assembly may include the use of a selector clutch assembly wherein a sliding collar of the selector clutch assembly is selectively engagable with at least a portion of the second shaft or at least a portion of the fourth shaft of the second gear assembly.

According to any one of the previous aspects of the disclosure, the selector clutch assembly may have a first position and a second position. When said selector clutch is in the first position the sliding collar is engaged with at least a portion of the second shaft and is not engaged with the fourth shaft of the second gear assembly. When said selector clutch is in the second position the sliding collar is engaged with the second shaft and the fourth shaft of the second gear assembly. As a result, when the selector clutch assembly is in the first position the drive unit assembly may be in a low speed high torque driving mode and when the selector clutch assembly is in the second position the dive unit assembly may be in a high speed low torque driving mode.

According to any one of the previous aspects of the disclosure, the drive unit assembly may further include the use of a one way cutch. At least a portion of the one-way clutch may be drivingly connected to at least a portion of the fourth gear and the third shaft of the second gear assembly.

According to any one of the previous aspects of the disclosure, the drive unit assembly may further include the use of a selector clutch assembly having a first clutch member, a second clutch member and a third clutch member. At least a portion of the second clutch member may be selectively engagable with the first clutch member or the third clutch member of the selector clutch assembly. Additionally, at least a portion of the first clutch member may be integrally connected to at least a portion of the second gear of the second gear assembly and at least a portion of the second clutch member may be drivingly connected to at least a portion of the second shaft of the second gear assembly. Furthermore, at least a portion of the third clutch member may be integrally connected to at least a portion of an eighth gear and at least a portion of the eighth gear is co-axial with the second shaft and drivingly connected to at least a portion of a ninth gear and at least a portion of the ninth gear may be drivingly connected to at least a portion of said first shaft.

According to any one of the previous aspects of the disclosure, the selector clutch assembly has a first position, a second position and a third position. When the selector clutch assembly is in the first position, the second clutch member may be drivingly disconnected from the first clutch member and the third clutch member. When the selector clutch assembly is in the second position, the second clutch member may be drivingly connected to at least a portion of the first clutch member and drivingly disconnected from the third clutch member. When the selector clutch assembly is in the third position, the second clutch member may be drivingly connected to at least a portion of the third clutch member and drivingly disconnected from the first clutch member. As a non-limiting example, when the selector clutch assembly is in the first position, the drive unit assembly in a neutral driving mode, when the selector clutch assembly is in the second position the drive unit assembly may be in a low speed high torque driving mode and when the selector clutch assembly is in the third position the dive unit assembly may be in a high speed low torque driving mode.

According to any one of the previous aspects of the disclosure, the first clutch member and the second gear may be rotationally supported on the second shaft by one or more eleventh bearing assemblies. Additionally, the third clutch member and the eighth gear may be rotationally supported on the second shaft by one or more twelfth bearing assemblies.

According to any one of the previous aspects of the disclosure, the drive unit assembly may include a selector clutch assembly having a first clutch member, a second clutch member, a third clutch member and fourth clutch member. At least a portion of the first clutch member may be integrally connected to at least a portion of the second gear and at least a portion of the second clutch member may be drivingly connected to at least a portion of the second shaft. Additionally, at least a portion of the third clutch member may be integrally connected to at least a portion of a housing of the drive unit assembly and at least a portion of the fourth clutch member may be selectively engagable with the first clutch member or the second clutch member of the selector clutch assembly. Furthermore, at least a portion of the fourth clutch member may be selectively engagable with the second clutch member or the third clutch member of the selector clutch assembly.

According to any one of the previous aspects of the disclosure, the selector clutch assembly may have a first position, a second position and a third position. When the selector clutch assembly is in the first position, the fourth clutch member may be drivingly disengaged with the first clutch member, the second clutch member and the third clutch member of the selector clutch assembly. When the selector clutch assembly is in the second position, at least a portion of the fourth clutch member may be engaged with the first clutch member and the second clutch member of the selector clutch assembly. When the selector clutch assembly is in the third position, at least a portion of the fourth clutch member may be engaged with the second clutch member and the third clutch member of the selector clutch assembly. As a result, when the selector clutch assembly is in the first portion the drive unit assembly may be a neutral driving mode, when the selector clutch assembly is in the second position the drive unit assembly may be in a low speed high torque driving mode and when the selector clutch assembly is in the third position the dive unit assembly may be in a high speed low torque driving mode.

According to any one of the previous aspects of the disclosure, the drive unit assembly may further include a second gear assembly having a first gear, a second gear, a third gear, a fourth gear, fifth gear, a sixth gear, a seventh gear, a second shaft, a third shaft and fourth shaft. At least a portion of the first gear may be drivingly connected to the second gear, at least a portion of the third gear may be drivingly connected to the fourth gear, at least a portion of the fifth gear may be drivingly connected to the sixth gear, and at least a portion of the seventh gear may be drivingly connected to the first plurality of ring gear teeth of the ring gear. Additionally, at least a portion of the first gear may be drivingly connected to at least a portion of the first shaft, at least a portion of the second gear may be rotationally supported on the second shaft by using one or more eleventh bearing assemblies, at least a portion of the third gear may be drivingly connected to at least a portion of the second shaft, at least a portion of the fourth and fifth gears may be drivingly connected to the third shaft and at least a portion of the sixth and seventh gears may be drivingly connected to at least a portion of the fourth shaft. A first selector clutch assembly may selectively drivingly connect and disconnect the second gear to and from driving engagement with the second shaft. A third gear assembly has a ninth gear, a tenth gear, an eleventh gear and a fifth shaft. At least a portion of the ninth gear may be drivingly connected to at least a portion of the tenth gear and at least a portion of the eleventh gear may be drivingly connected to the ring gear. Additionally, at least a portion of the ninth gear may be drivingly connected to the first shaft and the eleventh gear may be drivingly connected to at least a portion of the fifth shaft. A second selector clutch assembly selectively may drivingly connect and disconnect the tenth gear to and from driving engagement with the fifth shaft.

According to any one of the previous aspects of the disclosure, when the first selector clutch assembly and said second selector clutch assembly drivingly disconnect the second and tenth gears from driving engagement with the second and tenth shafts, the drive unit assembly may be neutral driving mode. When the first selector clutch assembly drivingly connects the second gear to the second shaft and the second selector clutch assembly drivingly disconnects the tenth gear from driving engagement with the fifth shaft, the drive unit assembly may be in a low speed high torque driving mode. When the first selector clutch assembly disconnects the second gear from driving engagement with the second shaft and the second selector clutch assembly drivingly connects the tenth gear to the fifth shaft, the drive unit assembly may be in a high speed low torque driving mode.

According to any one of the previous aspects of the disclosure, the drive unit assembly may further include one or more second motors. At least a portion of the one or more second motors may be drivingly connected to at least a portion of the first shaft at a point between the first gear and the third shaft of s the aid second gear assembly. According to any one of the previous aspects of the disclosure the one or more first and/or second motors may act as a generator.

BRIEF DESCRIPTION OF THE DRAWINGS

The above, as well as other advantages of the present disclosure, will become readily apparent to those skilled in the art from the following detailed description when considered in light of the accompanying drawings in which:

FIG. 3A is a schematic detailed view of a portion of the drive unit assembly illustrated in FIG. 3 where the selector clutch assembly is in a second position;

FIG. 5 is a schematic side-view of a drive unit assembly having a selector clutch assembly according to an alternative embodiment of the disclosure where the selector clutch assembly is in a first position;

FIG. 5A is a schematic detailed view of a portion of the drive unit assembly illustrated in FIG. 5 where the selector clutch assembly is in a second position;

FIG. 5B is a schematic detailed view of a portion of the drive unit assembly illustrated in FIGS. 5 and 5A where the selector clutch assembly is in a third position;

FIG. 7A is a schematic detailed view of a portion of the drive unit assembly illustrated in FIG. 7 where the selector clutch assembly is in a second position;

FIG. 7B is a schematic detailed view of a portion of the drive unit assembly illustrated in FIGS. 7 and 7A where the selector clutch assembly is in a third position;

DETAILED DESCRIPTION OF THE DISCLOSURE

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

It is within the scope of this disclosure, and as a non-limiting example, that the drive unit assembly disclosed herein may be used in automotive, off-road vehicle, all-terrain vehicle, construction, structural, marine, aerospace, locomotive, military, machinery, robotic and/or consumer product applications. Additionally, as a non-limiting example, the drive unit assembly disclosed herein may also be used in passenger vehicle, electric vehicle, hybrid vehicle, commercial vehicle, autonomous vehicles, semi-autonomous vehicles and/or heavy vehicle applications.

Figure 1:
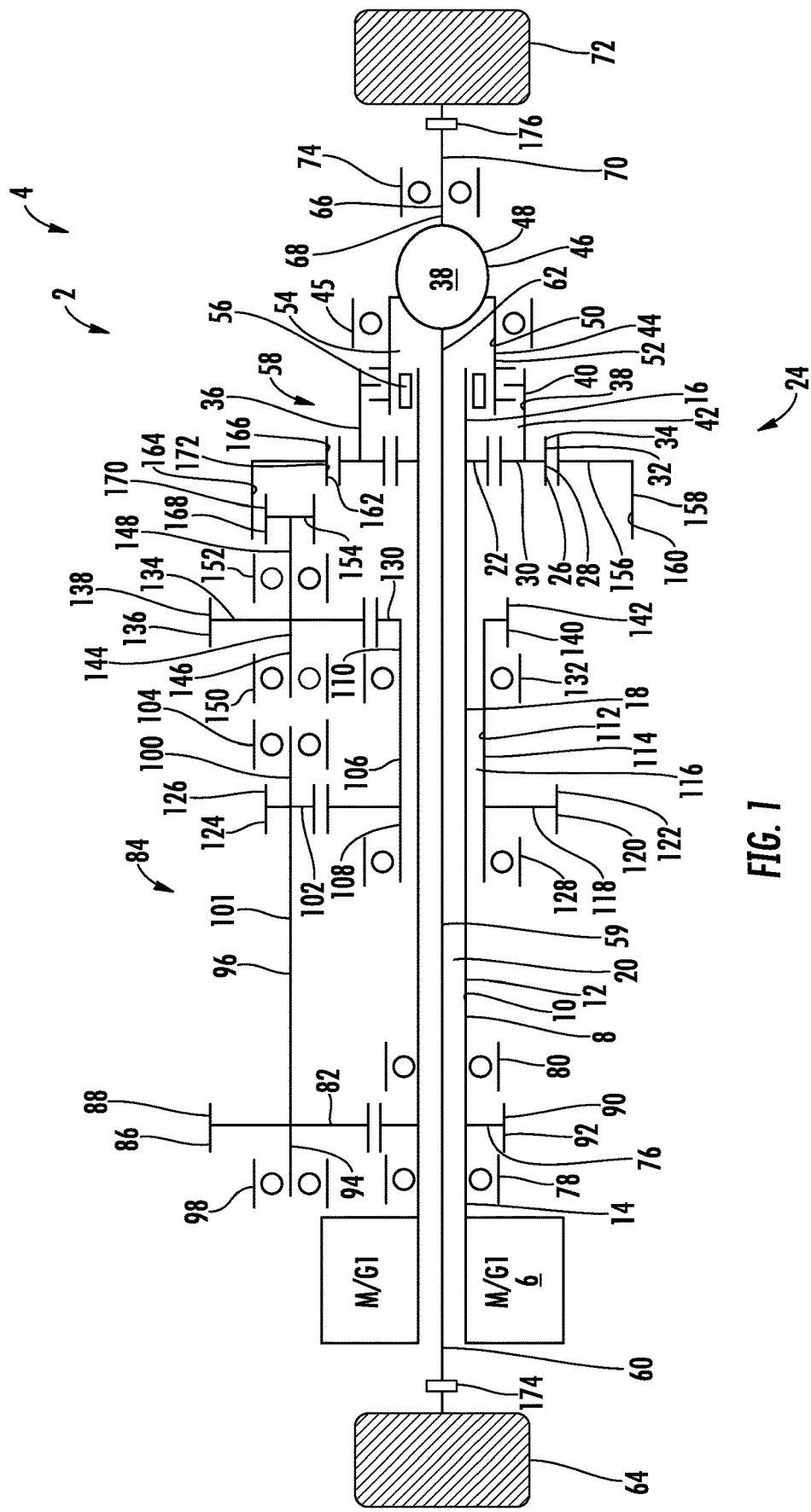
FIG. 1 is a schematic side-view of a drive unit assembly according to an embodiment of the disclosure.

FIG. 1 is a schematic side-view of a drive unit assembly 2 according to an embodiment of the disclosure. It is within the scope of this disclosure and as a non-limiting example that the drive unit assembly 2 may be a front axle drive unit assembly, a rear axle drive unit assembly, a forward tandem axle drive unit assembly and/or a rear tandem axle drive unit assembly of a vehicle 4.

As illustrated in FIG. 1 of the disclosure and as a non-limiting example, the drive unit assembly 2 includes one or more first motors 6 that are drivingly connected to at least a portion of a first shaft 8. The first shaft 8 has an inner surface 10, an outer surface 12, a first end portion 14, a second end portion 16 and an intermediate portion 18 interposed between the first and second end portions 14 and 16 of the first shaft 8. Additionally, inner surface 10 and the outer surface 12 of the first shaft 8 defines a hollow portion 20 therein. In accordance with the embodiment illustrated in FIG. 1 of the disclosure and as a non-limiting example, at least a portion of the first end portion 14 of the first shaft 8 is drivingly connected to at least a portion of the one or more first motors 6 of the drive unit assembly 2. It is within the scope of this disclosure and as a non-limiting example that the one or more first motors 6 may be one or more electric motors that are capable of converting an amount of electrical energy into rotational energy. Additionally, it is within the scope of this disclosure and as a non-limiting example that the one or more first motors 6 may be configured in order to act as a generator under certain operating conditions.

Drivingly connected to at least a portion of the second end portion 16 of the first shaft 8 is a sun gear 22 of a planetary gear assembly 24. Circumferentially extending from at least a portion of an outer surface 26 of the sun gear 22 is a plurality of sun gear teeth 28. It is within the scope of this disclosure and as a non-limiting example that the sun gear 22 of the planetary gear assembly 24 may be integrally formed as part of the second end portion 16 of the first shaft 8 of integrally connected to at least a portion of the second end portion 16 of the first shaft. As a non-limiting example, at least a portion of the sun gear 22 may be integrally connected to at least a portion of the second end portion 16 of the first shaft 8 by using one or more welds, one or more mechanical fasteners, one or more adhesives, a spline connection and/or a threaded connection.

Disposed radially outboard from at least a portion of the sun gear 22 is one or more planetary gears 30 of the planetary gear assembly 24. Circumferentially extending from at least a portion of an outer surface 32 of the one or more planetary gears 30 is a plurality of planetary gear teeth 34. The plurality of planetary gear teeth 34 on the outer surface 32 of the one or more planetary gears 30 are complementary to and meshingly engaged with at least a portion of the plurality of sun gear teeth 28 on the outer surface 26 of the sun gear 22. As a result, at least a portion of the one or more planetary gears 30 are drivingly connected to at least a portion of the sun gear 22 of the planetary gear assembly 24.

At least a portion of the one or more planetary gears 30 are drivingly connected to at least a portion of a carrier 36. The carrier 36 transmits the rotational power from the planetary gear assembly 24 to a differential gear assembly 38 of the drive unit assembly 2. As illustrated in FIG. 1 of the disclosure and as a non-limiting example, the carrier 36 of the planetary gear assembly 24 has an inner surface 38 and an outer surface 40 defining a hollow portion 42 therein. It is within the scope of this disclosure and as a non-limiting example that the differential assembly 38 may be a planetary differential assembly, an epicyclic differential assembly, a bevel gear differential assembly or a spur gear differential gear assembly.

Additionally, at least a portion of an end portion of the carrier 36, opposite the one or more planetary gears 30, is drivingly connected to at least a portion of a differential assembly input member 44. The differential assembly input member 44 drivingly connects the carrier 36 of the planetary gear assembly 24 to the differential assembly 38 of the drive unit assembly 2. It is within the scope of this disclosure and as a non-limiting example that the differential assembly input member 44 may be a differential ring gear or a differential carrier.

One or more seventeenth bearing assemblies 45 may be disposed outward from at least a portion of the differential assembly input member 44 of the differential assembly 38. It is to be understood that the one or more seventeenth bearing assemblies 45 may be used in order to provide rotational support for at least a portion of the differential assembly input member 44 and/or the differential assembly 38 of the drive unit assembly 2 of the vehicle 4.

In accordance with the embodiment illustrated in FIG. 1 and as a non-limiting example, the differential assembly input member 44 extends axially inboard from at least a portion of an outer surface 46 of a differential carrier 48 of the differential assembly 38. Additionally, at least a portion of the differential assembly input member 44 extends co-axially with at least a portion of the first shaft 8 and the carrier 36 of the drive unit assembly 2. The differential assembly input member 44 has an inner surface 50 and an outer surface 52 defining a hollow portion 54 therein. According to the embodiment illustrated in FIG. 1 of the disclosure and as a non-limiting example, at least a portion of the second end portion 16 of the first shaft 8 may be disposed within the hollow interior portions 42 and 54 of the carrier 36 and the differential assembly input member 44 of the drive unit assembly 2.

One or more first bearing assemblies 56 may provide rotational support for at least a portion of the second end portion 16 of the first shaft 8. As illustrated in FIG. 1 of the disclosure and as a non-limiting example, at least a portion of the one or more first bearing assemblies 56 may be interposed between the inner surface 50 of the differential assembly input member 44 and the outer surface 12 of the second end portion 16 of the first shaft 8 of the drive unit assembly 2.

The drive unit assembly 4 may include the use of an axle connect and disconnect device 58 to selectively connect and disconnect the differential assembly 38 from driving engagement with the one or more first motors 6 of the drive unit assembly 2. In accordance with the embodiment illustrated in FIG. 1 of the disclosure and as a non-limiting example, at least a portion of the axle connect and disconnect device 58 may be integrally connected to at least a portion of said carrier of said planetary gear assembly 24. Additionally, in accordance with the embodiment illustrated in FIG. 1 and as a non-limiting example, at least a portion of the axle connect and disconnect device 58 may be integrally connected to at least a portion of said differential assembly input member 44. It is within the scope of this disclosure and as a non-limiting example that the axle connect and disconnect device 58 may be a face clutch, a friction clutch, a dog clutch, a dry clutch or a wet clutch.

When the axle connect and disconnect device 58 is in a first position (not shown), the differential assembly 38 is drivingly connected to the one or more first motors 6. Additionally, when the axle connect and disconnect device 58 is in the second position (not shown), the differential assembly 38 is disconnected from driving engagement with the one or more first motors 6. By disengaging the one or more first motors 6 from driving engagement with the differential assembly 38 when the drive unit assembly 2 is not needed, the overall amount of drag losses associated with the drive unit assembly 2 can be reduced which increases the overall fuel economy and power consumption of the vehicle 4.

According to the embodiment where the axle connect and disconnect device 58 is a wet clutch, the wet clutch may be used to allow the transmission of a variable amount of rotational power from the one or more first motors 6 to the differential assembly 38. This may be achieved by applying a variable amount of force onto a plurality of clutch plates (not shown) that are drivingly connected to at least a portion of the carrier 36 and the differential assembly input member 44. It is to be understood that as the amount of rotational power transmitted to the differential assembly 38 increases, the amount of force applied onto the plurality of clutch plates (not shown) increases which in turn increases the overall amount of frictional force between the plurality of clutch plates (not shown).

Extending co-axially with at least a portion of the first shaft 8, the carrier 36 and the differential assembly input member 44 is a first axle half shaft 59 having a first end portion 60 and a second end portion 62. At least a portion of the first end portion 60 of the first axle half shaft 59 is drivingly connected to at least a portion of a first wheel assembly 64. Additionally, at least a portion of the second end portion 62 of the first axle have shaft is drivingly connected to at least a portion of an end of the differential assembly 38. It is within the scope of this disclosure and as anon-limiting example that the second end portion 62 of the first axle half shaft 59 may be drivingly connected to a first differential side gear, a shaft that is formed as part of the first differential side gear, a separate coupling shaft, a separate stub shaft, a first differential assembly output shaft and/or a first axle half shaft connect and disconnect device.

In accordance with the embodiment illustrated in FIG. 1 and as a non-limiting example, the first axle half shaft 59 may include the use of a first axle connect and disconnect device 174. The first axle connect and disconnect device 174 selectively connects and disconnects the first wheel assembly 64 to and from driving engagement with the drive unit assembly 2. When the first axle connect and disconnect device 174 is in a first engaged position, the first wheel assembly 64 is drivingly connected to the one or more first motors 6 of the drive unit assembly 2. When the first axle connect and disconnect device 174 is in a second disengaged position, the first wheel assembly 64 is not drivingly connected to the one or more first motors 6 of the drive unit assembly 2. By disengaging the first wheel assembly 64 from driving engagement with the one or more motors 6, the overall amount of drag losses associated drive unit assembly 2 can be reduced which increases the overall fuel economy and power consumption of the vehicle 4. Additionally, this prevents the one or more first motors 6 and the first gear assembly 84 from being back driven which may result in irreparable damage to the drive unit assembly 2 and/or a reduction in the overall life and durability of the drive unit assembly 2. It is within the scope of this disclosure and as a non-limiting example that the first axle connect and disconnect device 174 may be a clutch device, a wet clutch device, a dry clutch device, a face clutch device, a dog clutch device, a sliding collar clutch device and/or any other type of device that is able to selectively connect and disconnect the first wheel assembly 64 to and from driving engagement with the one or more first motors 6.

Drivingly connected to at least a portion of an end of the differential assembly 38, opposite the first axle half shaft 59, is a second axle half shaft 66 having a first end portion 68 and a second end portion 70. As illustrated in FIG. 1 of the disclosure and as a non-limiting example, at least a portion of the second end portion 70 of the second axle half shaft 66 is drivingly connected to at least a portion of a second wheel assembly 72. At least a portion of the first end portion 68 of the second axle half shaft 66 is drivingly connected to at least a portion of an end of the differential assembly 38 opposite the first axle half shaft 59. It is within the scope of this disclosure and as anon-limiting example that the first end portion 68 of the second axle half shaft 66 may be drivingly connected to a second differential side gear, a shaft that is formed as part of the second differential side gear, a separate coupling shaft, a separate stub shaft, a second differential assembly output shaft and/or a second axle half shaft connect and disconnect device.

According to the embodiment illustrated in FIG. 1 and as a non-limiting example, the second axle half shaft 66 may include the use of a second axle connect and disconnect device 176. The second axle connect and disconnect device 176 selectively connects, and disconnects the second wheel assembly 72 to and from driving engagement with the drive unit assembly 2. When the second axle connect and disconnect device 176 is in a first engaged position, the second wheel assembly 72 is drivingly connected to the one or more first motors 6 of the drive unit assembly 2. When the second axle connect and disconnect device 176 is in a second disengaged position, the second wheel assembly 72 is not drivingly connected to the one or more first motors 6 of the drive unit assembly 2. By disengaging the second wheel assembly 72 from driving engagement with the one or more motors 6, the overall amount of drag losses associated drive unit assembly 2 can be reduced which increases the overall fuel economy and power consumption of the vehicle 4. Additionally, this prevents the one or more first motors 6 and the first gear assembly 84 from being back driven which may result in irreparable damage to the drive unit assembly 2 and/or a reduction in the overall life and durability of the drive unit assembly 2. It is within the scope of this disclosure and as a non-limiting example that the second axle connect and disconnect device 176 may be a clutch device, a wet clutch device, a dry clutch device, a face clutch device, a dog clutch device, a sliding collar clutch device and/or any other type of device that is able to selectively connect and disconnect the second wheel assembly 72 to and from driving engagement with the one or more first motors 6.

The drive unit assembly 2 may include the use of one or more second bearing assemblies 74 disposed outboard from at least a portion of the differential assembly 38. As illustrated in FIG. 1 of the disclosure and as a non-limiting example, the one or more second bearing assemblies 74 are interposed between the differential assembly input member 44 and the second wheel assembly 72 of the drive unit assembly 2. It is to be understood that the one or more second bearing assemblies 74 provide rotational support for at least a portion of the differential assembly 38 and/or the second axle half shaft 66 when in operation.

In accordance with the embodiment illustrated in FIG. 1 of the disclosure and as a non-limiting example, the drive unit assembly may include the use of a first gear 76 that is drivingly connected to at least a portion of the first shaft 8 of the drive unit assembly 2. As illustrated in FIG. 1 of the disclosure and as a non-limiting example, the first gear 76 is interposed between the one or more first motors 6 and the sun gear 22 along the outer surface 12 of the first shaft 8. It is within the scope of this disclosure and as a non-limiting example that the first gear 76 may be integrally formed as part of the first shaft 8 or integrally connected to at least a portion of the first shaft 8 by using one or more mechanical fasteners, one or more welds, one or more adhesives, a splined connection and/or a threaded connection.

As best seen in FIG. 1 of the disclosure and as a non-limiting example, the drive unit assembly 2 may include the use of one or more third bearing assemblies 78 and one or more fourth bearing assemblies 80. At least a portion of the one or more third bearing assemblies 78 may be interposed between the one or more first motors 6 and the first gear 76 and at least a portion of the one or more fourth bearing assemblies 80 may be interposed between the first bear 76 and the sun gear 22 of the drive unit assembly 2. It is to be understood that the one or more third and fourth bearing assemblies 78 and 80 provide rotational support for the first end portion 14 of the first shaft 8 and the first gear 76 of the drive unit assembly 2.

Drivingly connected to at least a portion of the first gear 76 of the drive unit assembly 2 is a second gear 82 of a second gear assembly 84 thereby providing a power split arrangement for the drive unit assembly 2. As illustrated in FIG. 1 of the disclosure and as a non-limiting example, the second gear 82 has a plurality of second gear teeth 88 circumferentially extending from at least a portion of an outer surface 86 of the second gear 82 of the drive unit assembly 2. The plurality of second gear teeth 88 on the second gear 82 are complementary to and meshingly engaged with a plurality of first gear teeth 90 circumferentially extending from at least a portion of an outer surface 92 of the first gear 76 of the second gear assembly of the drive unit assembly 2. It is within the scope of this disclosure and as a non-limiting example that the second gear 82 may have an outermost diameter that is larger than an outermost diameter of the first gear 76 of the second gear assembly 84.

At least a portion of the second gear 82 may be drivingly connected to at least a portion of a first end portion 94 of a second shaft 96. As illustrated in FIG. 1 of the disclosure and as a non-limiting example, at least a portion of the second shaft 96 extends co-axially with at least a portion of the first shaft 8 and the first axle half shaft 59 of the drive unit assembly 2. It is within the scope of this disclosure and as a non-limiting example that the second gear 82 may be integrally formed as part of the second shaft 96 or may be integrally connected to at least a portion of the second shaft 96 by using one or more welds, one or more mechanical fasteners, one or more adhesives, a spline connection and/or a threaded connection.

Disposed outboard from and rotationally connected to at least a portion of the second shaft 96 is one of more fifth bearing assemblies 98. The one or more fifth bearing assemblies 98 provide rotational support for at least a portion of the first end portion 94 of the second shaft 96 and the second gear 82 of the drive unit assembly.

Drivingly connected to at least a portion of an intermediate portion 101 of the second shaft 96 is a third gear 102. As illustrated in FIG. 1 of the disclosure and as a non-limiting example, the intermediate portion 101 of the second shaft 96 is disposed between the first end portion 94 and a second end portion 100 of the second shaft 96. It is within the scope of this disclosure and as a non-limiting example that the third gear 102 may have an outermost diameter that is less than the outermost diameter of the second gear 82 of the drive unit assembly 2. Additionally, it is within the scope of this disclosure and as a non-limiting example that the third gear 102 may be integrally formed as part of the second shaft 96 or may be integrally connected to at least a portion of the second shaft 96 by using one or more welds, one or more mechanical fasteners, one or more adhesives, a spline connection and/or a threaded connection.

At least a portion of one or more sixth bearing assemblies 104 may be disposed outboard from at least a portion of the second end portion 100 of the second shaft 96. The one or more sixth bearing assemblies 104 provide rotational support for at least a portion of the second end portion 100 of the second shaft 96 and the third gear 102 of the second gear assembly 84.

In accordance with the embodiment illustrated in FIG. 1 of the disclosure and as a non-limiting example, the second gear assembly 84 of the drive unit assembly 2 may include a third shaft 106 that extends co-axially with at least a portion of the first shaft 8, the first axle half shaft 59 and/or the second shaft 96. The third shaft 106 has a first end portion 108, a second end portion 110, an inner surface 112 and an outer surface 114. The inner surface 112 and the outer surface 114 of the third shaft 106 defines a hollow portion 116 therein. As illustrated in FIG. 1 of the disclosure and as a non-limiting example, the hollow portion 116 of the third shaft 106 is of a size and shape to receive and/or retain at least a portion of the first shaft 8 and the first axle half shaft 59. Additionally, as illustrated in FIG. 1 of the disclosure and as a non-limiting example, at least a portion of the third shaft 106 is interposed between the sun gear 22 of the planetary gear assembly 24 and the first gear 76 of the second gear assembly 84 of the drive unit assembly 2.

Drivingly connected to at least a portion of the first end portion 108 of the third shaft 106 is a fourth gear 118. Circumferentially extending from at least a portion of an outer surface 120 of the fourth gear 118 is a plurality of fourth gear teeth 122. The plurality of fourth gear teeth 122 of the fourth gear 118 are complementary to and meshingly engaged with at least a portion of a plurality of third gear teeth 126 circumferentially extending from at least a portion of an outer surface 124 of the third gear 102 of the second gear assembly 84. It is within the scope of this disclosure and as a non-limiting example that the fourth gear 118 may be integrally formed as part of the third shaft 106 or integrally connected to at least a portion of the third shaft 106 by using one or more welds, one or more mechanical fasteners, one or more adhesives, an overriding clutch, a one way clutch, a spline connections and/or a threaded connection. According to the embodiment illustrated in FIG. 1 of the disclosure and as a non-limiting example, the fourth gear 118 may have an outermost diameter that is greater than the outer most diameter of the third gear 102 of the second gear assembly 84.

One or more seventh bearing assemblies 128 are disposed outboard from at least a portion of the first end portion 108 of the third shaft 106. The one or more seventh bearing assemblies 128 provide rotational support for at least a portion of the first end portion 108 of the third shaft and the fourth gear 118 of the drive unit assembly 2.

At least a portion of a fifth gear 130 is drivingly connected to at least a portion of the second end portion 110 of the third shaft 106. It is within the scope of this disclosure and as a non-limiting example that the fifth gear may have an outermost diameter that is less than the outermost diameter of the fourth gear 118 of the drive unit assembly 2. Additionally, it is within the scope of this disclosure and as a non-limiting example that the fifth gear 130 of the second gear assembly 84 may be integrally formed as part of the third shaft 106 or integrally connected to at least a portion of the third shaft 106 by using one or more welds, one or more mechanical fasteners, one or more adhesives, a spline connection and/or a threaded connection.

Disposed outboard from at least a portion of the second end portion 110 of the third shaft 106 is one or more eighth bearing assemblies 132. The one or more eighth bearing assemblies 132 provide rotational support for at least a portion of the second end portion 110 of the third shaft 106 and the fifth gear 130 of the drive unit assembly 2.

Drivingly connected to at least a portion of the fifth gear 130 is a sixth gear 134. Circumferentially extending from at least a portion of an outer surface 136 of the sixth gear 134 is a plurality of sixth gear teeth 138. The plurality of sixth gear teeth 138 are complementary to and meshingly engaged with at least a portion of a plurality of fifth gear teeth 142 circumferentially extending from at least a portion of an outer surface 140 of the fifth gear 130. It is within the scope of this disclosure and as a non-limiting example that the sixth gear 134 may have an outermost diameter that is greater than the outermost diameter of the fifth gear 130 of the drive unit assembly 2.

At least a portion of the sixth gear 134 may be drivingly connected to at least a portion of a fourth shaft 144 having a first end portion 146 and a second end portion 148. As illustrated in FIG. 1 of the disclosure and as a non-limiting example, at least a portion of the fourth shaft 144 extends co-axially with at least a portion of the first shaft 8, the first axle half shaft 59, the second shaft 96 and the third shaft 106 of the drive unit assembly 2. It is within the scope of this disclosure and as a non-limiting example that the sixth gear 134 may be integrally formed as part of the fourth shaft 144 or integrally connected to at least a portion of the fourth shaft 144 by using one or more welds, one or more mechanical fasteners, one or more adhesives, a spline connection and/or a threaded connection.

In order to provide rotational support for the fourth shaft 144, one or more ninth bearing assemblies 150 and one or more tenth bearing assemblies 152 may be disposed outboard from at least a portion of the fourth shaft 144. As illustrated in FIG. 1 of the disclosure and as a non-limiting example, the one or more ninth and tenth bearing assemblies 150 and 152 may be disposed on opposing sides of the sixth gear 134 of the second gear assembly 84.

Drivingly connected to at least a portion of the second end portion 148 of the fourth shaft 144 is a seventh gear 154. It is within the scope of this disclosure and as a non-limiting example that the seventh gear may have an outermost diameter that is less than the outermost diameter of the sixth gear 134 of the drive unit assembly 2.

Additionally, it is within the scope of this disclosure and as a non-limiting example that the seventh gear 154 may be integrally formed as part of the fourth shaft 144 or integrally connected to at least a portion of the fourth shaft 144 by using one or more welds, one or more mechanical fasteners, one or more adhesives, a spline connection and/or a threaded connection.

Disposed radially outboard from at least a portion of the seventh gear 154 of the second gear assembly 84 and the one or more planetary gears 30 of the planetary gear assembly 24 is a ring gear 156. As illustrated in FIG. 1 of the disclosure and as a non-limiting example, the ring gear 156 has an outer surface 158, a first inner surface 160 and a second inner surface 162. Circumferentially extending along at least a portion of the first inner surface 160 of the ring gear 156 is a first plurality of ring gear teeth 164 that are complementary to and meshingly engaged with at least a portion of a plurality of seventh gear teeth 170 circumferentially extending from at least a portion of an outer surface 168 of the seventh gear 154. Additionally, circumferentially extending from at least a portion of the second inner surface 162 of the ring gear 156 is a second plurality of ring gear teeth 172 that are complementary to and meshingly engaged with the plurality of planetary gear teeth 34 on the outer surface 32 of the one or more planetary gears 30. It is within the scope of this disclosure and as a non-limiting example that the first inner surface 160 of the ring gear 156 may have a diameter that is greater than a diameter of the second inner surface 162 of the ring gear 156.

In accordance with an embodiment of the disclosure and as a non-limiting example, the meshing arrangement of the first, second, third, fourth, fifth, sixth, seventh gears 76, 82, 102, 118, 130, 134, 154 and the ring gear 156 of the second gear assembly 84 may provide a reduction ratio of approximately 4.5:1 while providing a drive unit assembly 2 with a larger overall reduction ratio of approximately 90:1.

As illustrated in FIG. 1 of the disclosure and as a non-limiting example, the ring gear 156 drivingly connects the second gear assembly 84 to the planetary gear assembly 24 of the drive unit assembly 2. This provides the drive unit assembly 2 with a power summing planetary differential assembly 24 which allows the drive unit assembly 2 to achieve higher and more desirable torque and/or speed ratios compared to conventional drive unit assemblies. Additionally, the drive unit assembly 2 illustrated in FIG. 1 is able to achieve these higher and more desirable torque and/or speed ratios in a more compact and space saving arrangement making it desirable for not only future vehicle but vehicles currently on the road.

The drive unit assembly 2 illustrated in FIG. 1 may be a single speed drive unit with a longitudinal motor and gear train arrangement. It is to be understood that the drive unit assembly 2 may be used in electric and hybrid electric vehicles in order to increase the overall tractive effort of the vehicle 4 during launch and/or low speed driving modes.

Additionally, it is to be understood that the drive unit assembly 2 may be used as a drive axle that provides rotational power to the wheels 64 and 72 of the vehicle 4 when in high speed driving modes. Furthermore, it is to be understood that the one or more first motors 6 of the drive unit assembly 2 may be used as a generator when the vehicle 4 is in operation and the axle connect and disconnect device 58 is engaged drivingly connecting the one or more first motors 6 to the differential assembly 38. As a result, the drive unit assembly 2 may be used to provide the vehicle 4 with regenerative braking capabilities allowing the vehicle 4 to recapture an amount of energy that may be used or stored for later use.

Figure 2:
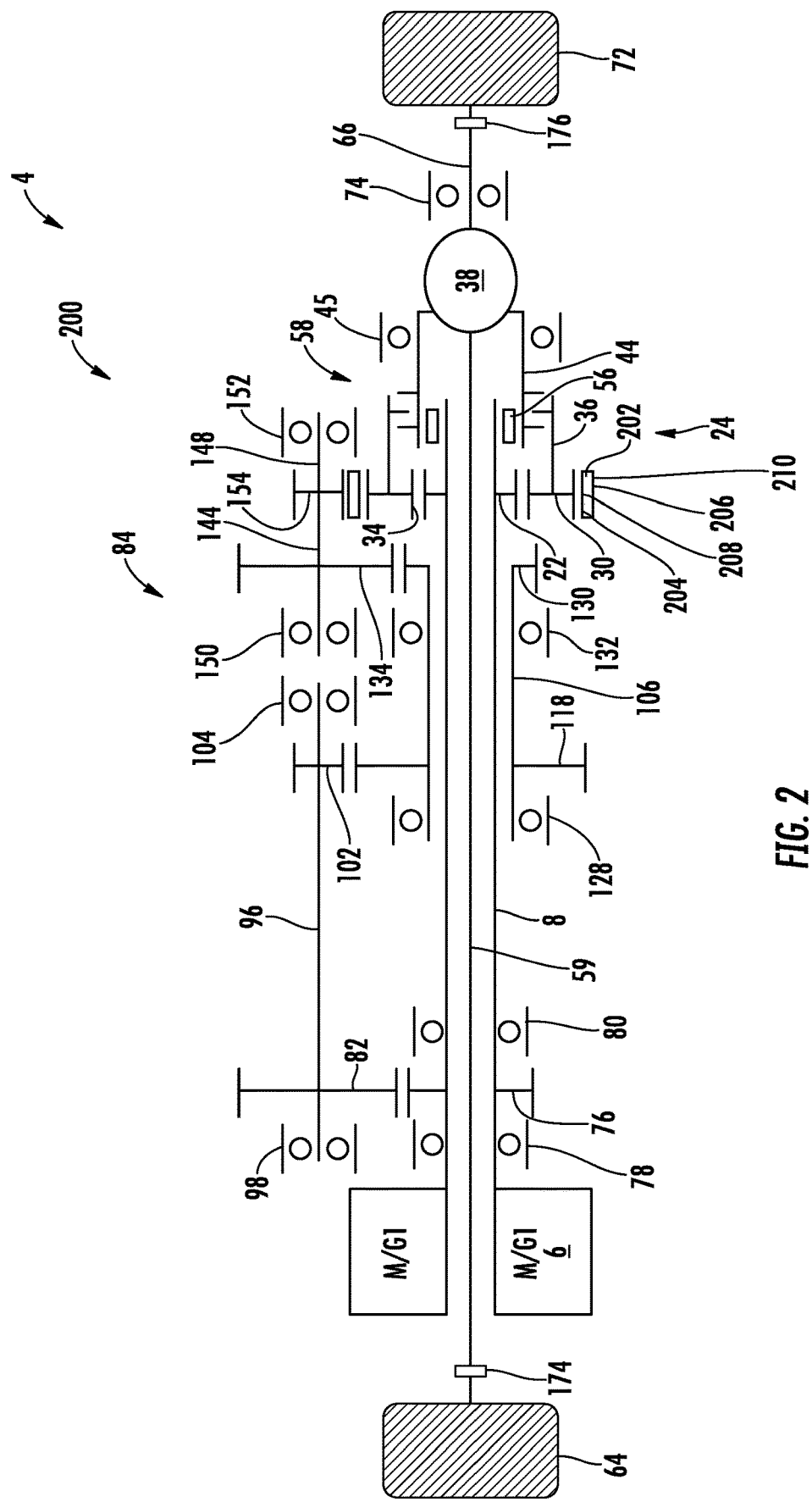
FIG. 2 is a schematic side-view of a drive unit assembly according to an alternative embodiment of the disclosure.

FIG. 2 is a schematic side-view of a drive unit assembly 200 according to an alternative embodiment of the disclosure. The drive unit assembly 200 illustrated in FIG. 2 is the same as the drive unit assembly 2 illustrated in FIG. 1, except where specifically noted below. As illustrated in FIG. 2 of the disclosure and as a non-limiting example, the drive unit assembly 200 does not include the ring gear 156 illustrated in FIG. 1 of the disclosure.

In accordance with the embodiment illustrated in FIG. 2 of the disclosure and as a non-limiting example the one or more tenth bearing assemblies 152 may be disposed outboard from at least a portion of the second end portion 148 of the fourth shaft 144 of the drive unit assembly 200. As a result, the seventh gear 154 may be interposed between the sixth gear 134 and the one or more tenth bearing assemblies 152. The one or more tenth bearing assemblies 152 aid in providing rotational support for the fourth shaft 144 and the seventh gear 154 of the drive unit assembly 200.

As illustrated in FIG. 2 of the disclosure and as a non-limiting example, the drive unit assembly 200 may include a ring gear 202 having an inner surface 204 and an outer surface 206 that is interposed between at least a portion of the seventh gear 154 and the one or more planetary gears 30 of the drive unit assembly 200. Circumferentially extending from at least a portion of the outer surface 206 of the ring gear 202 is a first plurality of ring gear teeth 210 that are complementary to the plurality of seventh gear teeth 170 on the outer surface 168 of the seventh gear 154. Additionally, circumferentially extending from at least a portion of the inner surface 204 of the ring gear 202 is a second plurality of ring gear teeth 208 that are complementary to the plurality of planetary gear teeth 34 on the outer surface 32 of the one or more planetary gears 30 of the planetary gear assembly 24.

It is therefore to be understood that the drive unit assembly 200 illustrated in FIG. 2 may be a single speed drive unit with a longitudinal motor and gear train arrangement. As a result, the drive unit assembly 200 illustrated in FIG. 2 is able to achieve the higher and more desirable torque and/or speed ratios in a more compact and space saving arrangement making it desirable for not only future vehicle but vehicles currently on the road.

Figure 3:
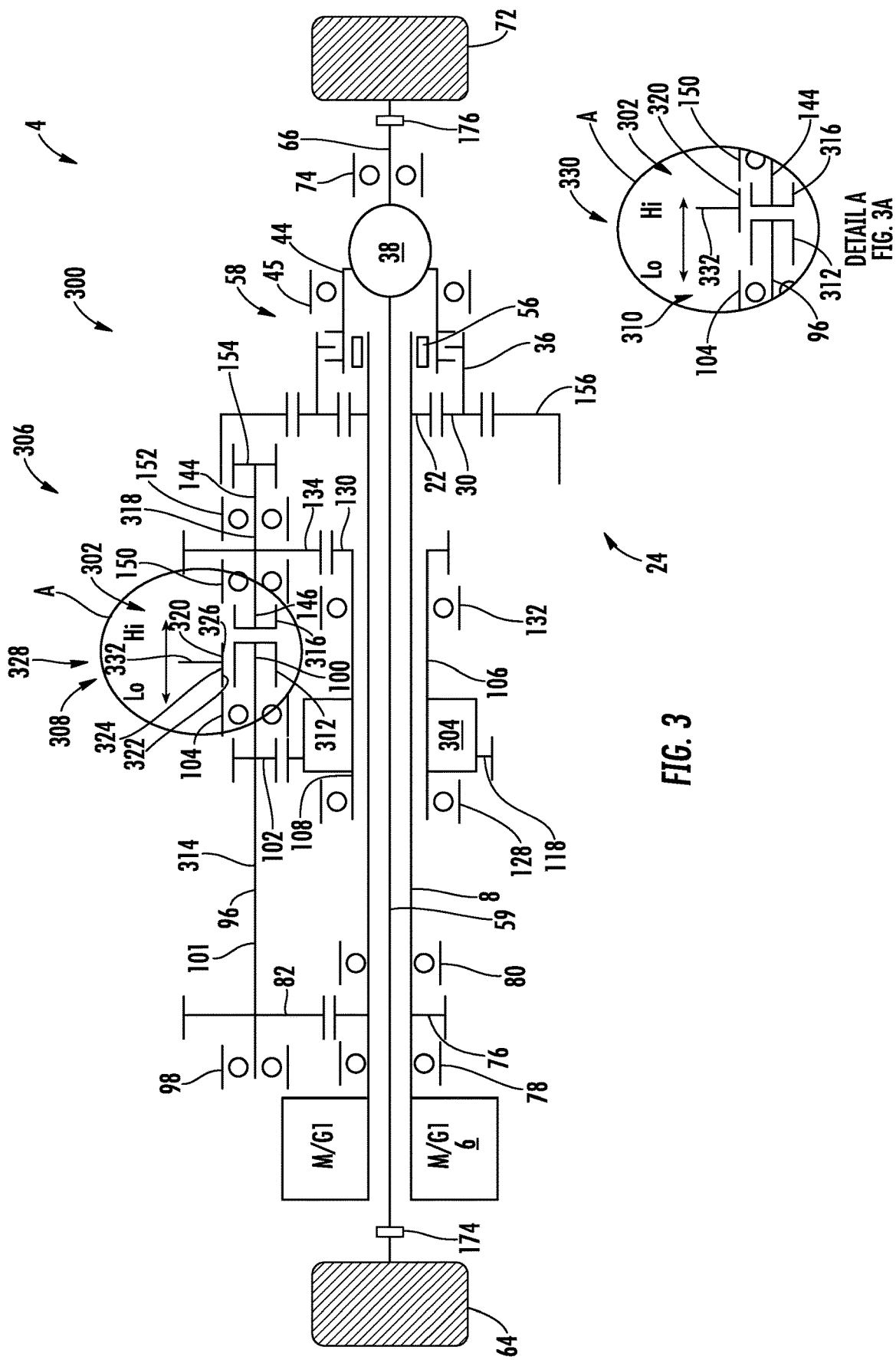
FIG. 3 is a schematic side-view if a drive unit assembly having a selector clutch assembly in a first position according to an alternative embodiment of the disclosure.

FIGS. 3 and 3A are a schematic side-view of a drive unit assembly 300 having a selector clutch assembly 302 according to an alternative embodiment of the disclosure. The drive unit assembly 300 illustrated in FIGS. 3 and 3A is the same as the drive unit assemblies 2 and 200 illustrated in FIGS. 1 and 2, except where specifically noted below. As best seen in FIG. 3 of the disclosure and as a non-limiting example, the drive unit assembly 300 includes the use of the ring gear 156 connecting the seventh gear 154 to the one or more planetary gears 30 of the planetary gear assembly 24.

In accordance with the embodiment illustrated in FIG. 3 and as a non-limiting example, the drive unit assembly 300 may include the use of a one way clutch 304 in order to drivingly connect at least a portion of the fourth gear 118 to at least a portion of the first end portion 108 of the third shaft 106 of a second gear assembly 306. The one way clutch 304 allows for the transfer of rotational power through the second gear assembly 306 in one rotational direction, while freely rotating and preventing the transfer of rotational power through the second gear assembly 306 in the opposite rotational direction. As a result, it is to be understood that when the drive unit assembly 300 is engaged in a high speed driving mode the one way clutch 304 will allow the third shaft 106 to freely rotate relative to the fourth gear 118. However, when the drive unit assembly 300 is in a low speed driving mode the third shaft 106 will not be able to rotate freely relative to the fourth gear 118. It is within the scope of this disclosure and as a non-limiting example that the one way clutch 304 may be a freewheel or an over running clutch.

According to an alternative embodiment of the disclosure (not shown) and as a non-limiting example, the one way clutch 304 may be integrally connected to at least a portion of the fifth gear 130 and the third shaft 106. As a result, when the drive unit assembly 300 is engaged in a high speed driving mode the one way clutch 304 will allow the third shaft 106 to freely rotate relative to the fifth gear 130. However, when the drive unit assembly 300 is in a low speed driving mode the third shaft 106 will not be able to rotate freely relative to the fifth gear 130.

In order to selectively transition the drive unit assembly 300 between a first driving mode and a second driving mode, the second gear assembly 306 may include the use of a selector clutch assembly 302. When the selector clutch assembly 302 is in a first (or disengaged) position 308 illustrated in FIG. 3 of the disclosure, the drive unit assembly 300 is in the first driving mode. It is within the scope of this disclosure and as a non-limiting example that the first driving mode may be a low gear driving mode that is used during low vehicle driving speeds, vehicle take off, tow modes and/or any other driving condition where an increased amount of torque is needed. When the selector clutch assembly 302 is in the second (or engaged) position 310 illustrated in FIG. 3A of the disclosure, the drive unit assembly 300 is in the second driving mode. It is within the scope of this disclosure and as a non-limiting example that the second driving mode may be a high gear driving mode that is used during high vehicle driving speeds and/or where a lower amount of torque is needed. As best seen in FIG. 3A of the disclosure and as a non-limiting example, when the selector clutch assembly 302 is in the second position 310, the ring gear 156 is grounded allowing for all of the rotational power generated by the one or more first motors 6 to be transferred to the sun gear 22 of the planetary gear assembly 24 without being first transmitted through the fourth and fifth gears 118 and 130. As a non-limiting example, the selector clutch assembly 302 may be a dog clutch, a face clutch, a wet clutch, a dry clutch, a friction clutch or a sliding collar type clutch.

According to the embodiment illustrated in FIGS. 3 and 3A of the disclosure and as a non-limiting example, the selector clutch assembly 302 may be a sliding collar type clutch. In accordance with this embodiment of the disclosure and as a non-limiting example, at least a portion of the second end portion 100 of the second shaft 96 may be rotationally connected to at least a portion of the first end portion 146 of the fourth shaft 144 of the drive unit assembly. Additionally, in accordance with this embodiment of the disclosure, the second shaft 96 may include a plurality of second shaft splines 312 circumferentially extending from at least a portion of an outer surface 314 of the second end portion 100 of the second shaft 96. Furthermore, in accordance with this embodiment of the disclosure, the fourth shaft 144 may include a plurality of fourth shaft splines 316 circumferentially extending from at least a portion of an outer surface 318 of the first end portion 146 of the fourth shaft 144.

Disposed radially outboard from at least a portion of the second end portion 100 of the second shaft 96 and/or the first end portion of the fourth shaft 144 is a sliding collar 320 having an inner surface 322 and an outer surface 324. Circumferentially extending from at least a portion of the inner surface 322 of the sliding collar 320 is a plurality of sliding collar splines 326. The plurality of sliding collar splines 326 are complementary to and selectively engagable with the plurality of second shaft splines 312 and/or the plurality of fourth shaft splines 316 on the second and third shafts 96 and 144 of the drive unit assembly 300.

As the sliding collar 320 is transitioned between the first and second positions 328 and 330 illustrated in FIGS. 3 and 3A, the selector clutch assembly 302 is transition between the first and second positions 308 and 310 respectively. In order to selectively transition the sliding collar 320 between the first and second positions 328 and 330, at least a portion of the outer surface 324 of the sliding collar 320 is drivingly connected to at least a portion of an actuation mechanism (not shown) via a shift fork 332. It is within the scope of this disclosure and as a non-limiting example that the actuation mechanism (not shown) may be an actuator, a linear actuator, an electro-magnetic actuator or any other type of actuation mechanism that is capable of transitioning the sliding collar 320 between the first and second positions 328 and 330 illustrated in FIGS. 3 and 3A.

It is therefore to be understood that the drive unit assembly 300 illustrated in FIGS. 3 and 3A may provide a two speed drive unit with a longitudinal motor and gear train arrangement. As a result, the drive unit assembly 300 illustrated in FIGS. 3 and 3A is able to achieve the higher and more desirable torque and/or speed ratios in a more compact and space saving arrangement making it desirable for not only future vehicle but vehicles currently on the road.

Figure 4:
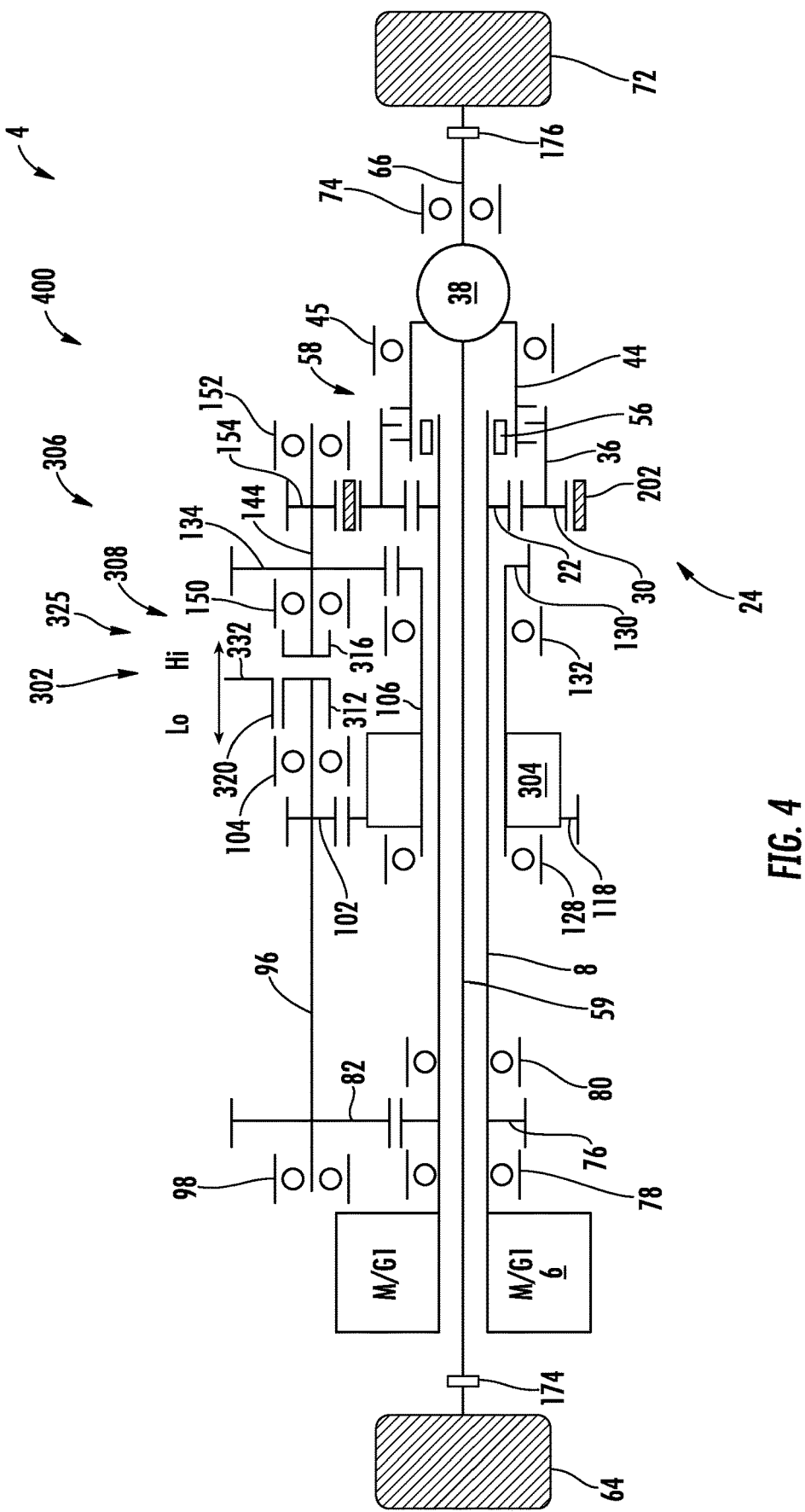
FIG. 4 is a schematic side-view of a drive unit assembly according to an alternative embodiment of the disclosure.

FIG. 4 is a schematic side-view of a drive unit assembly 400 according to an alternative embodiment of the disclosure. The drive unit assembly 400 illustrated in FIG. 4 is the same as the drive unit assemblies 2, 200 and 300 illustrated in FIGS. 1-3A, except where specifically noted below. As illustrated in FIG. 4 of the disclosure and as a non-limiting example, the drive unit assembly 400 does not include the use of the ring gear 156 described and illustrated in relation to FIGS. 1 and 3 to drivingly connect the second gear assembly 306 to the planetary gear assembly 24. Instead, the drive unit assembly 400 illustrated in FIG. 4 includes the use of the ring gear 202 described and illustrated in relation to FIG. 2 of this disclosure to drivingly connect the second gear assembly 306 to the planetary gear assembly 24 of the drive unit assembly 400.

It is therefore to be understood that the drive unit assembly 400 illustrated in FIG. 4 provides a two speed drive unit with a longitudinal motor and gear train arrangement. As a result, the drive unit assembly 400 illustrated in FIG. 4 is able to achieve the higher and more desirable torque and/or speed ratios in a more compact and space saving arrangement making it desirable for not only future vehicle but vehicles currently on the road.

FIGS. 5-5B provide a schematic illustration of a drive unit assembly 500 having a second gear assembly 502 according to an alternative embodiment of the disclosure. The drive unit assembly 500 illustrated in FIGS. 5-5B is the same as the drive unit assemblies 2, 200, 300 and 400 illustrated in FIGS. 1-4, except where specifically noted below. As best seen in FIG. 5 of the disclosure and as a non-limiting example, the drive unit assembly 500 includes the use of the ring gear 156 to drivingly connect the second gear assembly 502 to the planetary gear assembly 24 of the drive unit assembly 500. Additionally, as illustrated in FIG. 5 of the disclosure and as a non-limiting example, the drive unit assembly 500 does not include the use of the selector clutch assembly 302 described and illustrated in relations to FIGS. 3-4.

In accordance with the embodiment illustrated in FIGS. 5-5B of the disclosure and as a non-limiting example, the drive unit assembly 500 may include the use of a selector clutch assembly 504. The selector clutch assembly 504 is a device that is capable of selectively transitioning the drive unit assembly 500 between a first position 506 illustrated in FIG. 5, a second position 508 illustrated in FIG. 5A and a third position 510 illustrated in FIG. 5B. It is within the scope of this disclosure and as a non-limiting example that the selector clutch assembly 504 of the drive unit assembly 500 may be a wet clutch, dry clutch, a friction clutch, a dog clutch, a face clutch or a sliding collar type clutch.

According to the embodiment illustrated in FIGS. 5-5B of the disclosure and as a non-limiting example, the selector clutch assembly 504 includes a first clutch member 512, a second clutch member 514 and a third clutch member 516. As illustrated in FIGS. 5-5B of the disclosure and as a non-limiting example, at least a portion of the second clutch member 514 is drivingly and slidingly connected to at least a portion of the intermediate portion 101 of the second shaft 96 at a location between the second gear 82 and the third gear 102 of the second gear assembly 502. The second clutch member 514 is selectively engagable with the first clutch member 512 and the third clutch member 516 of the selector clutch assembly 504. It is within the scope of this disclosure and as a non-limiting example that at least a portion of the second clutch member 514 may be slidingly and drivingly connected to at least a portion of the second shaft 96 by using a splined connection (not shown).

As illustrated in FIGS. 5-5B of the disclosure and as a non-limiting example, the second gear 82 of the second gear assembly 502 is rotatively supported on the second shaft 96 by using one or more eleventh bearing assemblies 518 interposed between at least a portion of the second gear 82 and the second shaft 96. At least a portion of the first clutch member 512 may be integrally connected to at least a portion of the second gear 82 of the second gear assembly 502. It is within the scope of this disclosure and as a non-limiting example that the first clutch member 512 may be integrally formed as part of the second gear 82 or integrally connected to the second gear 82 by using one or more welds, one or more mechanical fasteners, one or more adhesives, a spline connection and/or a threaded connection.

Disposed outboard from at least a portion of the second shaft 96 is the third clutch member 516 of the selector clutch assembly 504. As illustrated in FIGS. 5-5B of the disclosure and as a non-limiting example, the third clutch member 516 is disposed adjacent to a side of the second clutch member 514 opposite the first clutch member 512 of the selector clutch assembly 504. At least a portion of the third clutch member 516 may be integrally connected to at least a portion of an eighth gear 520 of the second gear assembly 502.

Interposed between the third clutch member 516 and the eighth gear 520 and the second shaft 96 of the drive unit assembly 500 is one or more twelfth bearing assemblies 522. The one or more twelfth bearing assemblies 522 provide rotational support for at least a portion of the third clutch member and/or the eighth gear 520 of the drive unit assembly 500.

Drivingly connected to at least a portion of the first shaft 8 and the eighth gear 520 of the drive unit assembly 500 is a ninth gear 524. As best seen in FIG. 5 of the disclosure and as a non-limiting example, at least a portion of the ninth gear 524 is interposed between the first gear 76 and the third shaft 106 of the drive unit assembly 500. Circumferentially extending from at least a portion of an outer surface 526 of the ninth gear 524 is a plurality of ninth gear teeth 528. The plurality of ninth gear teeth 528 are complementary to and meshing engaged with a plurality of eighth gear teeth 530 circumferentially extending from at least a portion of an outer surface 532 of the eighth gear 520.

In order to selectively transition the second clutch member 514 between a first position 534 illustrated in FIG. 5, a second position 536 illustrated in FIG. 5A and a third position 538 illustrated in FIG. 5B, at least a portion of the second clutch member 514 may be connected to at least a portion of a collar 540. It is to be understood that when the collar 540 is in the first position 534, the second position 536 or the third position 538 the selector clutch assembly 504 is in the first, second or third position 506, 508 or 510 respectively. As best seen in FIG. 5 of the disclosure and as a non-limiting example, at least a portion of the second clutch member 514 is rotatively and drivingly connected to at least a portion of an inner surface 542 of the collar 540.

Drivingly connected to at least a portion of an outer surface 544 of the collar 540 is an actuation mechanism (not shown). The actuation mechanism (not shown) provides the force needed to selectively transition the second clutch member 514 between the first, second and third positions 534, 536 and 538 illustrated in FIGS. 5-5B. It is within the scope of this disclosure and as a non-limiting example that the actuation mechanism (not shown) may be an actuator, a linear actuator, an electro-magnetic actuator or any other type of actuation mechanism that is capable of transitioning the collar 540 between the first, second and third positions 534, 536 and 538 illustrated in FIGS. 5-5B.

When the second clutch member 514 is in the first position 534 illustrated in FIG. 5, the second clutch member 514 is disconnected from driving engagement with the first and third clutch members 512 and 516 of the selector clutch assembly 504. As a result, the drive unit assembly 500 is in a neutral driving mode where the one or more first motors 6 are disconnected from driving engagement with the differential assembly 38 of the drive unit assembly 500.

As best seen in FIG. 5A and as a non-limiting example, when the second clutch member 514 is in the second position 536 at least a portion of the second clutch member 514 is drivingly connected to at least a portion of the first clutch member 512 and the second gear 82 of the selector clutch assembly 504 thereby providing the drive unit assembly 500 with a first driving mode. It is within the scope of this disclosure and as a non-limiting example that the first driving mode may be a low gear driving mode that is used during low vehicle driving speeds, vehicle take off, tow modes and/or any other driving condition where an increased amount of torque is needed.

When the second clutch member 514 is in the third position 538 illustrated in FIG. 5B of the disclosure, at least a portion of the second clutch member 514 is drivingly connected to at least a portion of the third clutch member 516 and the eighth gear 520 thereby providing the drive unit assembly 500 with a second driving mode. It is within the scope of this disclosure and as a non-limiting example that the second driving mode may be a high gear driving mode that is used during high vehicle driving speeds and/or where a lower amount of torque is needed.

It is therefore to be understood that the drive unit assembly 500 illustrated in FIGS. 5-5B may provide a two speed drive unit with a longitudinal motor and gear train arrangement. As a result, the drive unit assembly 500 illustrated in FIGS. 5-5B is able to achieve the higher and more desirable torque and/or speed ratios in a more compact and space saving arrangement making it desirable for not only future vehicle but vehicles currently on the road.

Figure 6:
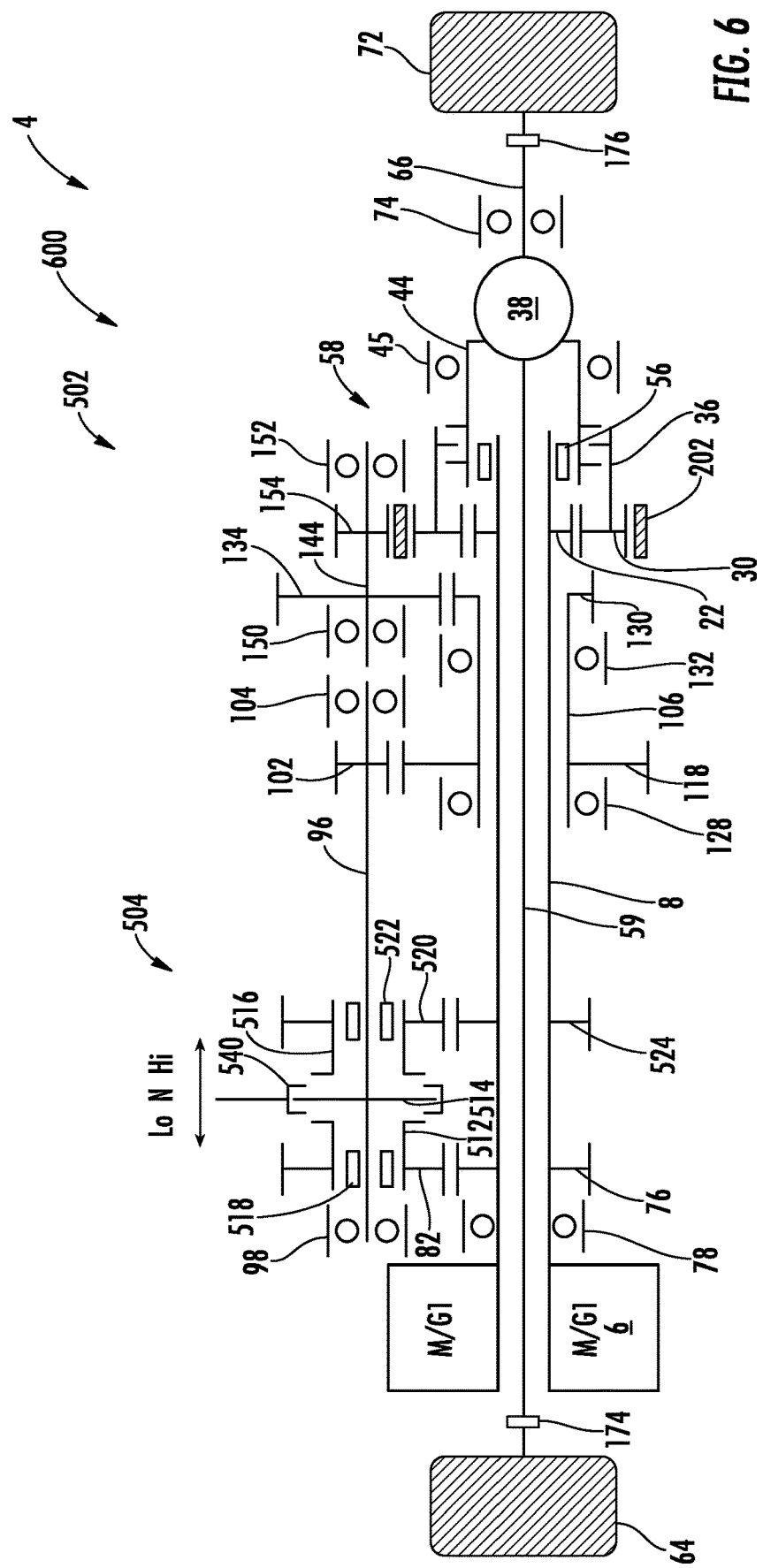
FIG. 6 is a schematic side-view of a drive unit assembly according to an alternative embodiment of the disclosure.

FIG. 6 is a schematic side-view of a drive unit assembly 600 according to an alternative embodiment of the disclosure. The drive unit assembly 600 illustrated in FIG. 6 is the same as the drive unit assemblies 2, 200, 300, 400 and 500 illustrated in FIGS. 1-5B, except where specifically noted below. As illustrated in FIG. 6 of the disclosure and as a non-limiting example, the drive unit assembly 600 does not include the use of the ring gear 156 described and illustrated in relation to FIGS. 1, 3 and 5-5B to drivingly connect the second gear assembly 502 to the planetary gear assembly 24. Instead, the drive unit assembly 600 illustrated in FIG. 6 includes the use of the ring gear 202 described and illustrated in relation to FIGS. 2 and 4 of this disclosure to drivingly connect the second gear assembly 502 to the planetary gear assembly 24 of the drive unit assembly 600.

It is therefore to be understood that the drive unit assembly 600 illustrated in FIG. 6 provides a two speed drive unit with a longitudinal motor and gear train arrangement. As a result, the drive unit assembly 600 illustrated in FIG. 6 is able to achieve the higher and more desirable torque and/or speed ratios in a more compact and space saving arrangement making it desirable for not only future vehicle but vehicles currently on the road.

Figure 7:
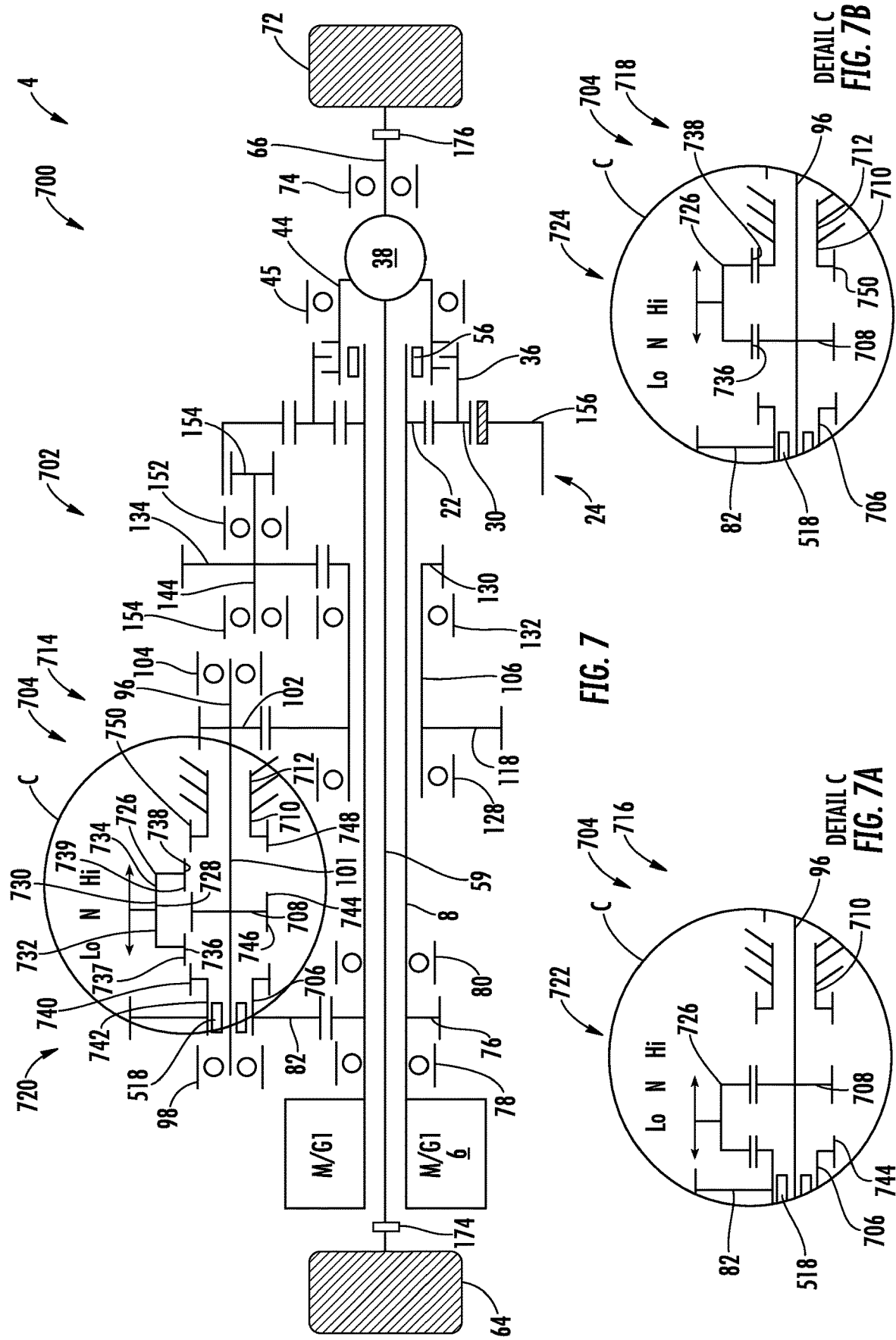
FIG. 7 is a schematic side-view of a drive unit assembly having a selector clutch assembly according to an alternative embodiment of the disclosure where the selector clutch assembly is in a first position.

FIGS. 7-7B provide a schematic illustration of a drive unit assembly 700 according to an alternative embodiment of the disclosure. The drive unit assembly 700 illustrated in FIGS. 7-7B is the same as the drive unit assemblies 2, 200, 300, 400, 500 and 600 illustrated in FIGS. 1-6, except where specifically noted below. As illustrated in FIGS. 7-7B of the disclosure and as a non-limiting example, the drive unit assembly 700 does not include the use of the selector clutch assembly 302 describe and illustrated in relation to FIGS. 3-4. Additionally, as best seen in FIG. 7 and as a non-limiting example, the drive unit assembly 700 includes the use of the ring gear 156 described and illustrated in relation to FIGS. 1, 3 and 5-5B of the disclosure to drivingly connect a second gear assembly 702 to the planetary gear assembly 24.

In accordance with the embodiment illustrated in FIG. 707B of the disclosure and as a non-limiting example, the drive unit assembly 700 includes the use of a selector clutch 704. The selector clutch assembly 704 is a device that is capable of selectively transitioning the drive unit assembly 700 between a first position 714 illustrated in FIG. 7, a second position 716 illustrated in FIG. 7A and a third position 718 illustrated in FIG. 7B. It is within the scope of this disclosure and as a non-limiting example that the selector clutch assembly 704 of the drive unit assembly 700 may be a wet clutch, dry clutch, a friction clutch, a dog clutch, a face clutch or a sliding collar type clutch.

According to the embodiment illustrated in FIGS. 7-7B of the disclosure and as a non-limiting example the selector clutch assembly 704 may include a first clutch member 706, a second clutch member 708 and a third clutch member 710.

At least a portion of the first clutch member 706 is integrally connected to at least a portion of the second gear 82 of the second gear assembly 702 of the drive unit assembly 700. As a result, at least a portion of the first clutch member 706 and the second gear 82 of the drive unit assembly 700 are rotationally supported on the second shaft 96 by the one or more eleventh bearing assemblies 518. It is within the scope of this disclosure and as a non-limiting example that the first clutch member 706 may be integrally formed as part of the second gear 82 or integrally connected to at least a portion of the second gear 82 by using one or more welds, one or more mechanical fasteners, one or more adhesives, a spline connection and/or a threaded connection.

Disposed outboard from and extending co-axially with the second shaft 96 of the second gear assembly 702 of the drive unit assembly 700 is the third clutch member 710. As illustrated in FIGS. 7-7B of the disclosure and as a non-limiting example, at least a portion of the third clutch member 710 is integrally connected to (or grounded) to at least a portion of a housing 712 of the drive unit assembly 700. It is within the scope of this disclosure and as a non-limiting example that the drive unit assembly 700 may include the use of one or more thirteenth bearing assemblies (not shown) interposed between the second shaft 96 and the third clutch member 710. The one or more thirteenth bearing assemblies (not shown) may be used in order to provide additional support for the second shaft 96 when in operation.

At least a portion of the second clutch member 708 is interposed between the first and third clutch members 706 and 710 of the selector clutch assembly 704. In accordance with the embodiment illustrated in FIGS. 7-7B and as a non-limiting example, at least a portion of the second clutch member 708 is drivingly connected to at least a portion of the intermediate portion 101 of the second shaft 96 of the drive unit assembly 700. It is within the scope of this disclosure and as a non-limiting example that the second clutch member 708 may be integrally formed as part of the second shaft 96 or integrally connected to at least a portion of the second shaft 96 by using one or more welds, one or more mechanical fasteners, one or more adhesives, a splined connection and/or a threaded connection. Additionally, it is within the scope of this disclosure and as a non-limiting example that the selector clutch assembly 704 may be the same as the selector clutch assembly 504 described and illustrated in relation to FIGS. 5-5B, except that the third clutch member 710 of the selector clutch assembly 704 may be selectively grounded but the third clutch member 516 of the selector clutch assembly 504 may not be selectively grounded.

In order to selectively transition the selector clutch assembly 704 between a first position 720 illustrated in FIG. 7, a second position 722 illustrated in FIG. 7B and a third position 724 illustrated in FIG. 7B, at least a portion of a fourth clutch member 726 is disposed outboard from at least a portion of the first, second and/or third clutch members 706, 708 and/or 710 of the selector clutch assembly 704. It is to be understood that when the fourth clutch member 726 is in the first position 720, the second position 722 or the third position 724 the selector clutch assembly 704 is in the first, second or third position 714, 716 or 718 respectively. As best seen in FIG. 7 of the disclosure and as a non-limiting example, the fourth clutch member 726 may include an inner surface 728, an outer surface 730, a first end portion 732 and a second end portion 734. At least a portion of the first end portion 732 of the fourth clutch member 726 has a first engagement portion 737 and at least a portion of said second end portion 734 of said collar has a second engagement portion 739. The first engagement portion 737 may be selectively engagable with said first clutch member 706 and said second clutch member 708 and said second engagement portion 739 may be selectively engagable with said second clutch member 708 and said third clutch member 710 of said selector clutch assembly 704.

According to the embodiment illustrated in FIG. 7 and as a non-limiting example a first plurality of fourth clutch member teeth 736 may circumferentially extending from at least a portion of the first end portion 732 of the inner surface 728 of the fourth clutch member 726. Additionally, in accordance with the embodiment illustrated in FIG. 7 and as a non-limiting example, a second plurality of fourth clutch member teeth 738 may circumferentially extending from at least a portion of the second end portion 734 of the inner surface 728 of the fourth clutch member 726. It is within the scope of this disclosure and as a non-limiting example that the first and second plurality of fourth clutch member teeth 736 and 738 may be a plurality of splines, a plurality of dog clutch teeth and/or a plurality of gear teeth.

When the fourth clutch member 726 is in the first position 720 illustrated in FIG. 7, neither the first plurality of fourth clutch member teeth 736 or the second plurality of fourth clutch member teeth 738 are engaged with the first, second or third clutch members 706, 708 or 710. As a result, it is to be understood that when the fourth clutch member 726 is in the first position 720, the drive unit assembly 700 is in a neutral driving mode where the one or more first motors 6 are disconnected from driving engagement with the differential assembly 38.

As best seen in FIG. 7A and as a non-limiting example, when the fourth clutch member 726 is in the second position 722, at least a portion of the first plurality of fourth clutch member teeth 736 are meshing and drivingly engaged with at least a portion of a plurality of first clutch member teeth 740. The plurality of first clutch member teeth 740 circumferentially extending from at least a portion of an outer surface 742 of the first clutch member 706. Additionally, as illustrated in FIG. 7, when the fourth clutch member 726 is in the second position 722, at least a portion of the second plurality of fourth clutch member teeth 738 are meshing and drivingly engaged with at least a portion of a plurality of second clutch member teeth 744. The plurality of second clutch member teeth 744 circumferentially extend from at least a portion of an outer surface 746 of the second clutch member 708. The meshing and driving engagement of the fourth clutch member 726 with the first and second clutch members 706 and 708 provides the drive unit assembly 700 with a first driving mode. It is within the scope of this disclosure and as a non-limiting example that the first driving mode may be a low gear driving mode that is used during low vehicle driving speeds, vehicle take off, tow modes and/or any other driving condition where an increased amount of torque is needed. As a non-limiting example that the plurality of first clutch member teeth 740 and the plurality of second clutch member teeth 744 may be a plurality of splines, a plurality of dog clutch teeth and/or a plurality of gear teeth.

When the fourth clutch member 726 is in the third position 724 illustrated in FIG. 7B and as a non-limiting example, at least a portion of the first plurality of fourth clutch member teeth 736 are meshing and drivingly connected to at least a portion of the plurality of second clutch member teeth 744. Additionally, as illustrated in FIG. 7B, when the fourth clutch member 726 is in the third position 724, at least a portion of the second plurality of fourth clutch member teeth 738 are meshing and drivingly engaged with at least a portion of a plurality of third clutch member teeth 748. The plurality of third clutch member teeth 748 circumferentially extend from at least a portion of an outer surface 750 of the third clutch member 710. The meshing and driving engagement of the fourth clutch member 726 with the second and third clutch members 708 and 710 provides the drive unit assembly 700 with a second driving mode by grounding the ring gear 156. It is within the scope of this disclosure and as a non-limiting example that the second driving mode may be a high gear driving mode that is used during high vehicle driving speeds and/or where a lower amount of torque is needed.

In order to transition the fourth clutch member 726 between the first, second and third positions 720, 722 and 724 illustrated in FIGS. 7-7B, at least a portion of the outer surface 730 of the fourth clutch member 726 is drivingly connected to at least a portion of an actuation mechanism (not shown). The actuation mechanism (not shown) provides the force needed to selectively transition the fourth clutch member 726 between the first, second and third positions 720, 722 and 724 illustrated in FIGS. 7-7B. It is within the scope of this disclosure and as a non-limiting example that the actuation mechanism (not shown) may be an actuator, a linear actuator, an electro-magnetic actuator or any other type of actuation mechanism that is capable of transitioning the fourth clutch member 726 between the first, second and third positions 720, 722 and 724 illustrated in FIGS. 7-7B.

It is therefore to be understood that the drive unit assembly 700 illustrated in FIGS. 7-7B may provide a two speed drive unit with a longitudinal motor and gear train arrangement. As a result, the drive unit assembly 700 illustrated in FIGS. 7-7B is able to achieve the higher and more desirable torque and/or speed ratios in a more compact and space saving arrangement making it desirable for not only future vehicle but vehicles currently on the road.

Figure 8:
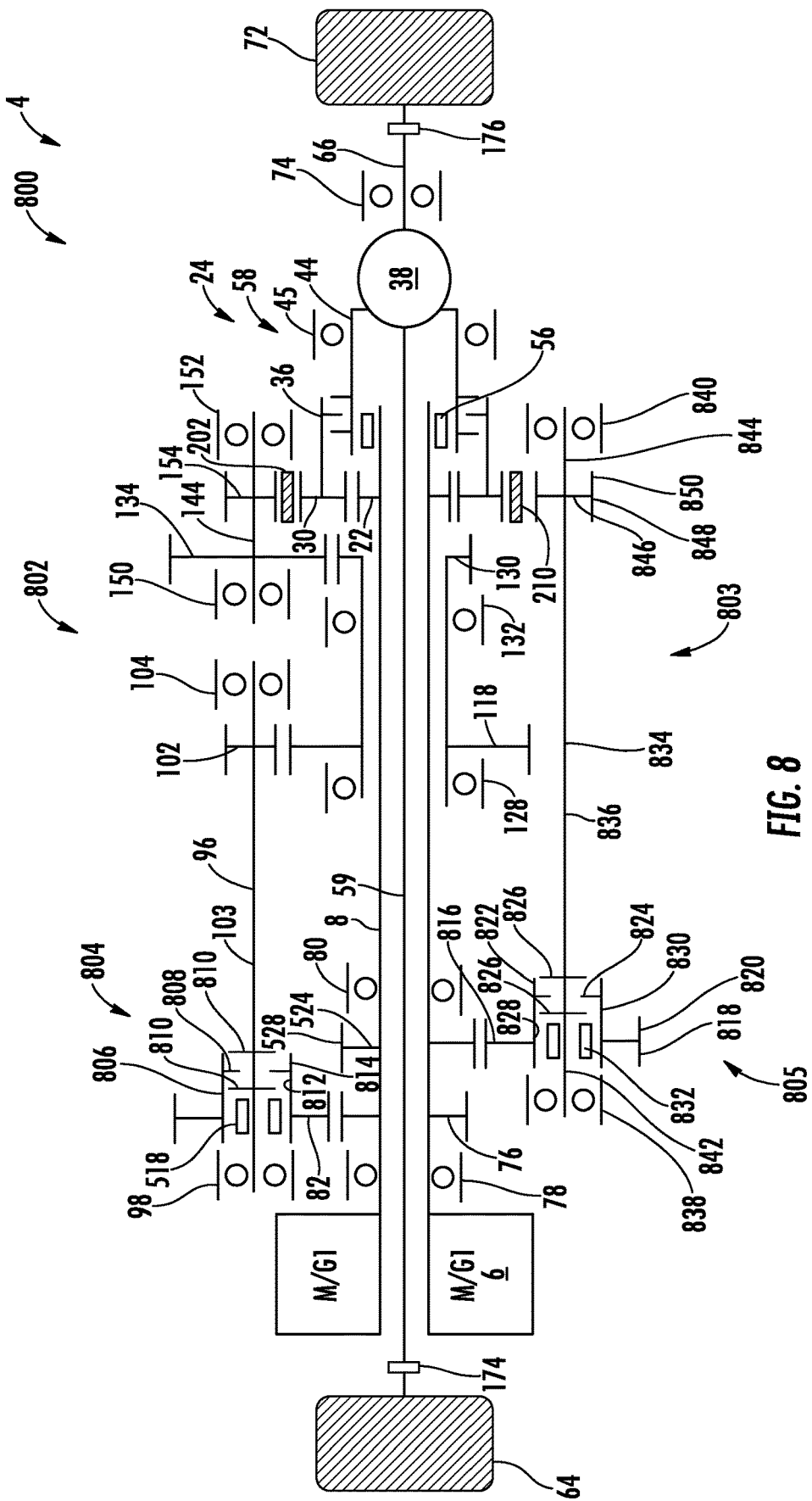
FIG. 8 is a schematic side-view of a drive unit assembly according to an alternative embodiment of the disclosure.

FIG. 8 is a schematic side-view of a drive unit assembly 800 according to an alternative embodiment of the disclosure. The drive unit assembly 800 illustrated in FIG. 8 is the same as the drive unit assemblies 2, 200, 300, 400, 500, 600 and 700 illustrated in FIGS. 1-7, except where specifically noted below. In accordance with the embodiment illustrated in FIG. 8 of the disclosure and as a non-limiting example, the drive unit assembly 800 does not include the use of the selector clutch assemblies 302, 504 and 704 illustrated in FIGS. 3-7.

In accordance with the embodiment illustrated in FIG. 8 of the disclosure and as a non-limiting example, the drive unit assembly 800 includes the use of the ring gear 202 to drivingly connect a second gear assembly 802 and a third gear assembly 803 to the planetary gear assembly 24. It is to be understood that the drive unit assembly 800 may include the use of the ring gear 156 described and illustrated in relation to FIGS. 1, 3, 5 and 7-7B in place of the ring gear 202 in order to drivingly connect the second and third gear assemblies 802 and 803 to the planetary gear assembly 24 of the drive unit assembly 800.

As illustrated in FIG. 8 of the disclosure and as a non-limiting example, the second gear assembly 802 may include a first selector clutch assembly 804 and the third gear assembly 803 may include a second selector clutch assembly 805. It is within the scope of this disclosure and the first and second selector clutch assemblies 804 and 805 may be a face clutch, a friction clutch, a dog clutch, a dry clutch or a wet clutch.

According to the embodiment illustrated in FIG. 8 of the disclosure and as a non-limiting example, the first selector clutch assembly 804 may include a first clutch member 806, a second clutch member 808 and a third clutch member 810. The first clutch member 806 of the first selector clutch assembly 804 has an inner surface 812 and an outer surface 814. As best seen in FIG. 8 of the disclosure and as a non-limiting example, at least a portion of the second gear 82 of the second gear assembly 802 may be integrally connected to at least a portion of the first clutch member 806 of the first selector clutch assembly 804. It is within the scope of this disclosure and as a non-limiting example that the first clutch member 806 may be integrally formed as part of the second gear 82 or may be integrally connected to at least a portion of the second gear 82 by using one or more welds, one or more mechanical fasteners, one or more adhesives, a spline connection and/or a threaded connection.

As best seen in FIG. 8 of the disclosure and as a non-limiting example, at least a portion of the first clutch member 806 and/or the second gear 82 of the second gear assembly 802 may be rotationally supported by the one or more eleventh bearing assemblies 518. It is therefore within the scope of this disclosure and as a non-limiting example that at least a portion of the one or more eleventh bearing assemblies 518 may be interposed between the second shaft 96 of the second gear assembly 802 and the second gear 82 and/or the first clutch member 806 of the second gear assembly 802. Drivingly and slidingly connected to at least a portion of the inner surface 812 of the first clutch member 806 of the first selector clutch assembly 804 is the second clutch member 808. At least a portion of the second clutch member 808 is selectively engagable with at least a portion of the third clutch member 810 of the first selector clutch assembly 804. It is within the scope of this disclosure and as a non-limiting example that the second clutch member 808 may be a first plurality of friction plates that are selectively engagable with the third clutch member 810.

Drivingly and slidingly connected to at least a portion of an outer surface 103 of the second shaft 96 is the third clutch member 810 of the first selector clutch assembly 804. As a non-limiting example that the third clutch member 810 may be a second plurality of friction plates that are selectively engagable with the first plurality of friction clutch plates of the first selector clutch assembly 804.

It is within the scope of this disclosure and as a non-limiting example that the first selector clutch assembly 804 may further include the use of a first actuation mechanism (not shown) that applies an amount of force onto the first and/or second plurality of friction plates thereby driving the first and second plurality of friction plates into contact with each other. As a result, this transitions the first selector clutch assembly 804 from a disengaged position to an engaged position. Once the amount of force applied by the actuation mechanism (not shown) is released, the first and second plurality of clutch plates are drivingly disconnected from each other thereby transitioning the first selector clutch assembly 804 from the engaged position to the disengaged position. It is within the scope of this disclosure and as a non-limiting example that the actuation mechanism (not shown) may be an actuator, a linear actuator, a pneumatic actuator, a hydraulic actuator, a cam actuation mechanism, an electro-magnetic actuator and/or an electro-mechanical actuation mechanism.

Drivingly connected to at least a portion of the ninth gear 524 which is drivingly connected to at least a portion of the first shaft 8 of the drive unit assembly 800 is a tenth gear 816. Circumferentially extending from at least a portion of an outer surface 818 of the tenth gear 816 is a plurality of tenth gear teeth 820. The plurality of tenth gear teeth 820 are complementary to and meshingly engaged with the plurality of ninth gear teeth 528 of the ninth gear 524.

As best seen in FIG. 8 of the disclosure and as a non-limiting example, the second selector clutch assembly 805 may include a first clutch member 822, a second clutch member 824 and a third clutch member 826. The first clutch member 822 of the second selector clutch assembly 805 has an inner surface 828 and an outer surface 830. In accordance with the embodiment illustrated in FIG. 8 of the disclosure and as a non-limiting example, at least a portion of the tenth gear 816 of the third gear assembly 803 may be integrally connected to at least a portion of the first clutch member 822 of the second selector clutch assembly 805. It is within the scope of this disclosure and as a non-limiting example that the first clutch member 822 may be integrally formed as part of the tenth gear 816 or may be integrally connected to at least a portion of the tenth gear 816 by using one or more welds, one or more mechanical fasteners, one or more adhesives, a spline connection and/or a threaded connection.

According to the embodiment illustrated in FIG. 8 and as a non-limiting example, at least a portion of the first clutch member 822 and/or the tenth gear 816 of the third gear assembly 803 may be rotationally supported by the one or more fourteenth bearing assemblies 832. It is therefore within the scope of this disclosure and as a non-limiting example that at least a portion of the one or more fourteenth bearing assemblies 832 may be interposed between a fifth shaft 834 of the third gear assembly 803 and the tenth gear 816 and/or the first clutch member 822 of the third gear assembly 803.

Drivingly and slidingly connected to at least a portion of the inner surface 828 of the first clutch member 822 of the second selector clutch assembly 804 is the second clutch member 824. At least a portion of the second clutch member 824 is selectively engagable with at least a portion of the third clutch member 826 of the second selector clutch assembly 805. It is within the scope of this disclosure and as a non-limiting example that the second clutch member 824 may be a third plurality of friction plates that are selectively engagable with the third clutch member 824.

Drivingly and slidingly connected to at least a portion of an outer surface 836 of the fifth shaft 834 is the third clutch member 826 of the second selector clutch assembly 805. As a non-limiting example that the third clutch member 826 may be a fourth plurality of friction plates that are selectively engagable with the third plurality of friction clutch plates of the second selector clutch assembly 805.

It is within the scope of this disclosure and as a non-limiting example that the second selector clutch assembly 805 may further include the use of a second actuation mechanism (not shown) that applies an amount of force onto the third and/or fourth plurality of friction plates thereby driving the third and fourth plurality of friction plates into contact with each other. As a result, this transitions the second selector clutch assembly 805 from a disengaged position to an engaged position. Once the amount of force applied by the actuation mechanism (not shown) is released, the third and fourth plurality of clutch plates are drivingly disconnected from each other thereby transitioning the second selector clutch assembly 805 from the engaged position to the disengaged position. It is within the scope of this disclosure and as a non-limiting example that the actuation mechanism (not shown) may be an actuator, a linear actuator, a pneumatic actuator, a hydraulic actuator, a cam actuation mechanism, an electro-magnetic actuator and/or an electro-mechanical actuation mechanism.

In accordance with the embodiment illustrated in FIG. 8 of the disclosure and as a non-limiting example, the fifth shaft 834 may be rotationally supported by one or more fifteenth bearing assemblies 838 and one or more sixteenth bearing assemblies 840. According to the embodiment illustrated in FIG. 8 and as a non-limiting example, at least a portion of the one or more fifteenth bearing assemblies 838 may be disposed outboard from at least a portion of a first end portion 842 of the fifth shaft 834 of the third gear assembly 803. Additionally, according to the embodiment illustrated in FIG. 8 and as a non-limiting example, at least a portion of the one or more sixteenth mearing assemblies 840 may be disposed outboard from at least a portion of a second end portion 844 of the fifth shaft 834.

At least a portion of an eleventh gear 846 may be drivingly connected to at least a portion of the second end portion 844 of the fifth shaft 834 of the third gear assembly 803 of the drive unit assembly 800. It is within the scope of this disclosure and as a non-limiting example that the eleventh gear 846 may be integrally formed as part of the fifth shaft 834 or integrally connected to at least a portion of the fifth shaft 834 by using one or more welds, one or more mechanical fasteners, one or more adhesives, a spline connection and/or a threaded connection.

Circumferentially extending from at least a portion of an outer surface 848 of the eleventh gear 846 is a plurality of eleventh gear teeth 850. At least a portion of the plurality of eleventh gear teeth 850 are complementary to and meshingly engaged with at least a plurality of ring gear teeth 210 of the ring gear 202. As a result, it is therefore to be understood that the eleventh gear 846 is drivingly connected to at least a portion of the ring gear 202 of the planetary gear assembly 24 of the drive unit assembly 800.

When the first selector clutch assembly 804 is engaged and the second selector clutch assembly 805 is disengaged, it may provide the vehicle 4 with a first driving mode. It is within the scope of this disclosure and as a non-limiting example that the first driving mode may be a low gear driving mode that is used during low vehicle driving speeds, vehicle take off, tow modes and/or any other driving condition where an increased amount of torque is needed. When the second selector clutch assembly 805 is engaged and the first selector clutch assembly 804 is disengaged, it may provide the vehicle 4 with a second driving mode. It is within the scope of this disclosure and as a non-limiting example that the second driving mode may be a high gear driving mode that is used during high vehicle driving speeds and/or where a lower amount of torque is needed. When the first and second selector clutch assemblies 804 and 805 are disengaged, the drive unit assembly 800 is in a third driving mode. It is within the scope of this disclosure and as a non-limiting example that the third driving mode may be a neutral driving mode. It is within the scope of this disclosure and as a non-limiting example that when the drive unit assembly 800 is in the first and second driving modes the one or more first motors 6 may be used as a generator to provide the vehicle 4 with regenerative braking capabilities allowing the vehicle 4 to recapture an amount of energy that may be used or stored for later use.

It is therefore to be understood that the drive unit assembly 800 illustrated in FIG. 8 may provide a two speed drive unit with a longitudinal motor and gear train arrangement. As a result, the drive unit assembly 800 illustrated in FIG. 8 is able to achieve the higher and more desirable torque and/or speed ratios in a more compact and space saving arrangement making it desirable for not only future vehicle but vehicles currently on the road.

Figure 9:
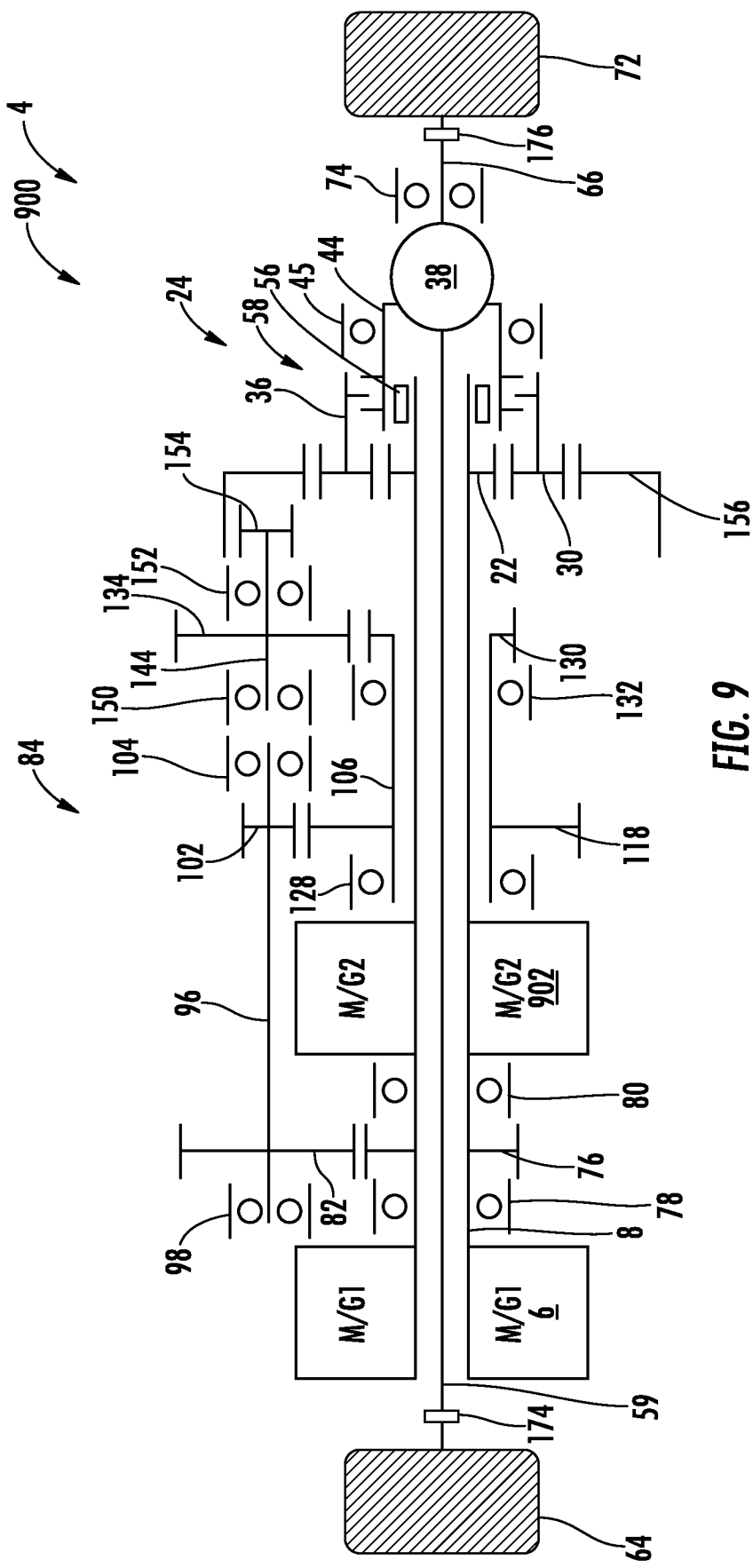
FIG. 9 is a schematic side-view of a drive unit assembly illustrated in FIG. 1 of the disclosure according to another embodiment of the disclosure.

FIG. 9 is a schematic side-view of a drive unit assembly 900 according to another embodiment of the disclosure. The drive unit assembly 900 illustrated in FIG. 9 is the same as the drive unit assembly 2 illustrated in FIG. 1, except where specifically noted below. In accordance with the embodiment illustrated in FIG. 9 and as a non-limiting example, the drive unit assembly 900 may include the use of one or more second motors 902. It is within the scope of this disclosure and as a non-limiting example that the one or more second motors 902 may be one or more electric motors that are capable of converting an amount of electrical energy into rotational energy. Additionally, it is within the scope of this disclosure and as a non-limiting example that the one or more second motors 902 may be configured in order to act as a generator under certain operating conditions.

As best seen in FIG. 9 of the disclosure and as a non-limiting example, at least a portion of the one or more second motors are drivingly connected to at least a portion of the first shaft 8 of the drive unit assembly 900. According to the embodiment illustrated in FIG. 9 and as a non-limiting example, the one or more first and/or second motors 6 and/or 902 may be used in order to drive the sun gear 22 of the planetary gear assembly 24 and/or the first gear 76 of the second gear assembly 84. It is within the scope of this disclosure and as a non-limiting example that the one or more second motors 902 may be drivingly connected to at least a portion of the first shaft 8 of the drive unit assembly 900 at a point between the first gear 76 and the third shaft 106 of the drive unit assembly 900.

By allowing the one or more first and second motors 6 and 902 to drive the first gear 76 and the sun gear 22, the one or more first and second motors 6 and 902 may be smaller and have a lower power rating than if a single motor was used. As a result, the drive unit assembly 9000 may be able to achieve a more compact and space saving arrangement. Additionally, by making the one or more first and second motors 6 and 902 to drive the first gear 76 and the sun gear 22, it allows the drive unit assembly 900 to be more modular and customizable. This allows the drive unit assembly 900 to be used in a wider array of potential applications by altering the power rating of the one or more first and/or second motors 6 and/or 902 to meet the needs for any potential vehicle application.

In a first mode of operation for the drive unit assembly 900, the one or more first motors 6 may provide the rotational power needed to drive the first gear 76 of the second gear assembly 84 and/or the sun gear 22 of the planetary gear assembly 24 while the one or more second motors 902 are used as a generator. In a second mode of operation for the drive unit assembly 900, the one or more second motors 902 may provide the rotational power needed to drive the first gear 76 of the second gear assembly 84 and/or the sun gear 22 of the planetary gear assembly 24 while the one or more first motors 6 are used as a generator. In a third mode of operation for the drive unit assembly 900, the one or more first and second motors 6 and 902 may provide the rotational power needed to drive the first gear 76 of the second gear assembly 84 and/or the sun gear 22 of the planetary gear assembly 24. When in the third mode of operation, neither the one or more first motors 6 or the one or more second motors 902 are used as generators. In a fourth mode of operation for the drive unit assembly 900, neither the one or more first and second motors 6 and 902 provide the rotational power needed to drive the first gear 76 of the second gear assembly 84 and/or the sun gear 22 of the planetary gear assembly 24. When in the fourth mode of operation, the one or more first motors 6 and/or the one or more second motors 902 may be used as generators.

It is to be understood that the drive unit assembly 900 illustrated in FIG. 9 may be a single speed drive unit with a longitudinal motor and gear train arrangement providing a more compact and space saving arrangement making it desirable for not only future vehicle but vehicles currently on the road.

Figure 10:
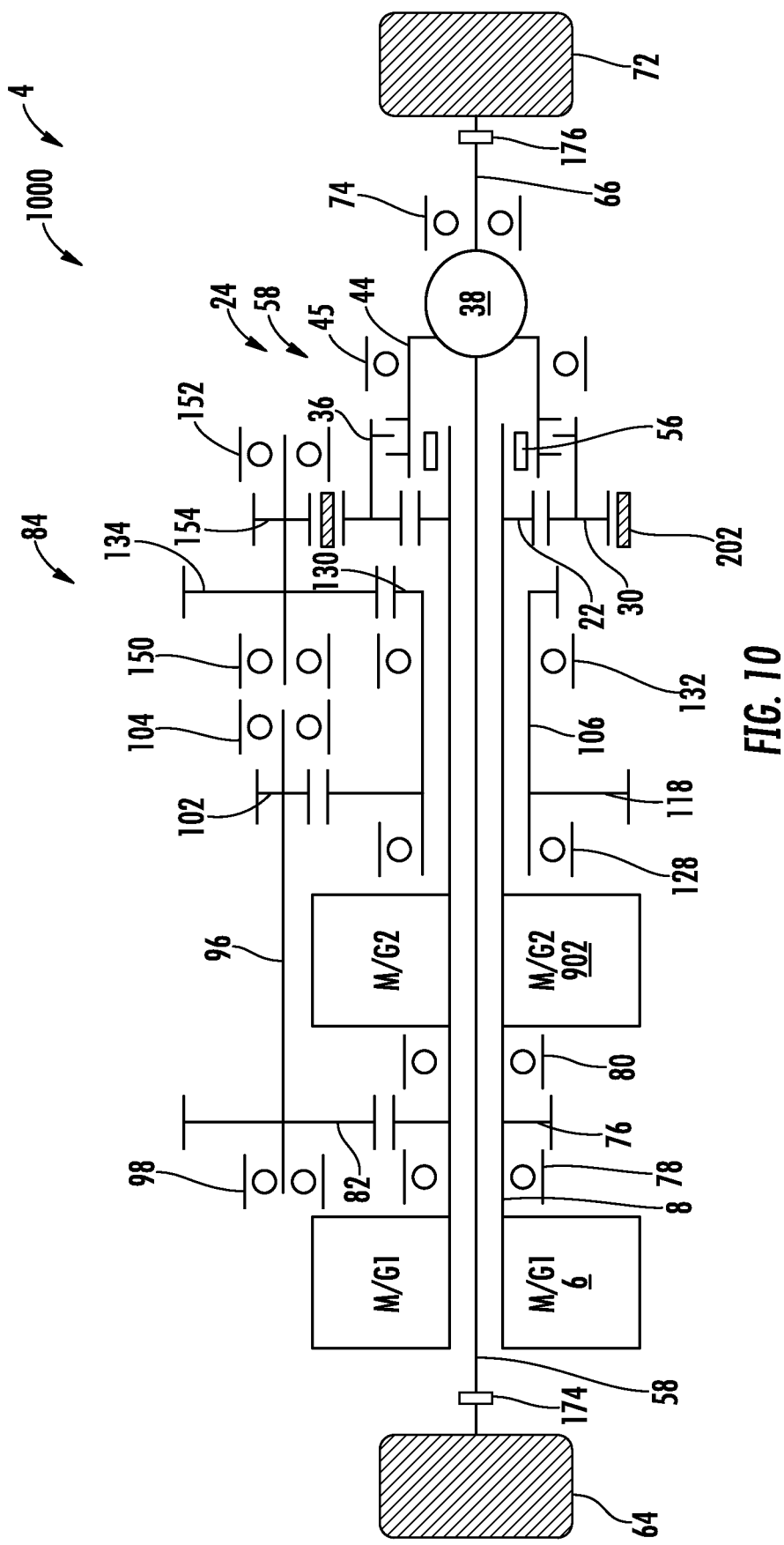
FIG. 10 is a schematic side-view of a drive unit assembly illustrated in FIG. 2 of the disclosure according to another embodiment of the disclosure.

FIG. 10 is a schematic side-view of a drive unit assembly 1000 according to another embodiment of the disclosure. The drive unit assembly 1000 illustrated in FIG. 10 is the same as the drive unit assemblies 2, 200 and 900 illustrated in FIGS. 1, 2 and 9, except where specifically noted below. In accordance with the embodiment illustrated in FIG. 10 and as a non-limiting example, the drive unit assembly 1000 may include the use of the one or more second motors 902. Additionally, in accordance with the embodiment illustrated in FIG. 10 and as a non-limiting example, the drive unit assembly 1000 may include the use of the ring gear 202 described and illustrated in relation to FIGS. 2, 4, 6 and 8 in order to drivingly connect the second gear assembly 84 to the planetary gear assembly 24.

It is to be understood that the drive unit assembly 1000 illustrated in FIG. 10 may be a single speed drive unit with a longitudinal motor and gear train arrangement providing a more compact and space saving arrangement making it desirable for not only future vehicle but vehicles currently on the road.

Figure 11:
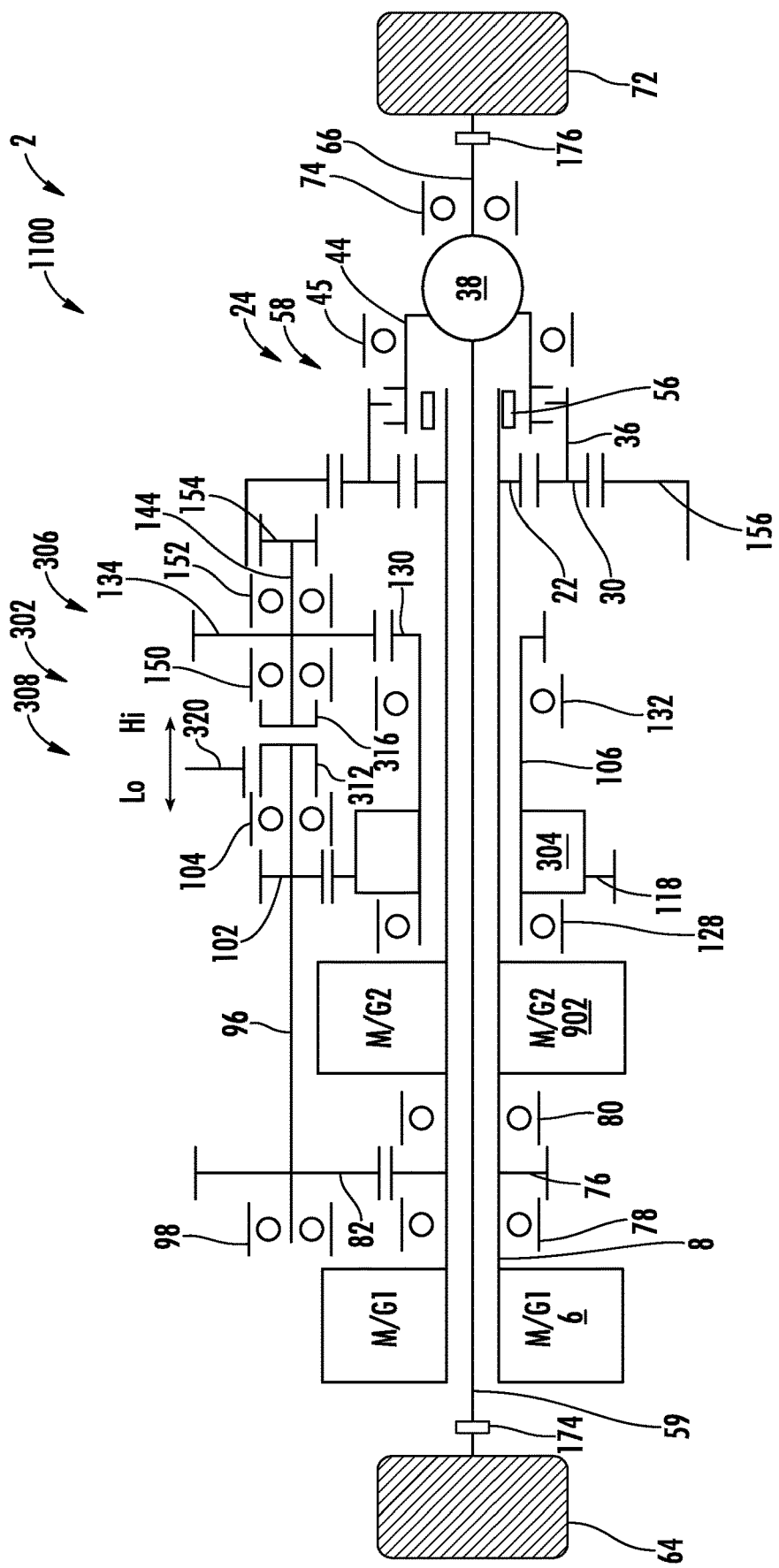
FIG. 11 is a schematic side-view of a drive unit assembly illustrated in FIG. 3 of the disclosure according to another embodiment of the disclosure.

FIG. 11 is a schematic side-view of a drive unit assembly 1100 according to another embodiment of the disclosure. The drive unit assembly 1100 illustrated in FIG. 11 is the same as the drive unit assemblies 300, 900 and 1000 illustrated in FIGS. 3, 3A, 9 and 10, except where specifically noted below. In accordance with the embodiment illustrated in FIG. 11 of the disclosure and as a non-limiting example, the drive unit assembly 1100 may include the use of the one or more second motors 902. Additionally, in accordance with the embodiment illustrated in FIG. 11 of the disclosure and as a non-limiting example, the drive unit assembly 1100 may include the use of the ring gear 156 described and illustrated in relation to FIGS. 1, 3, 5, 7 and 9 in order to drivingly connect the second gear assembly 306 to the planetary gear assembly 24.

It is therefore to be understood that the drive unit assembly 1100 illustrated in FIG. 11 may provide a two speed drive unit with a longitudinal motor and gear train arrangement. As a result, the drive unit assembly 1100 illustrated in FIG. 11 is able to achieve the higher and more desirable torque and/or speed ratios in a more compact and space saving arrangement making it desirable for not only future vehicle but vehicles currently on the road.

Figure 12:
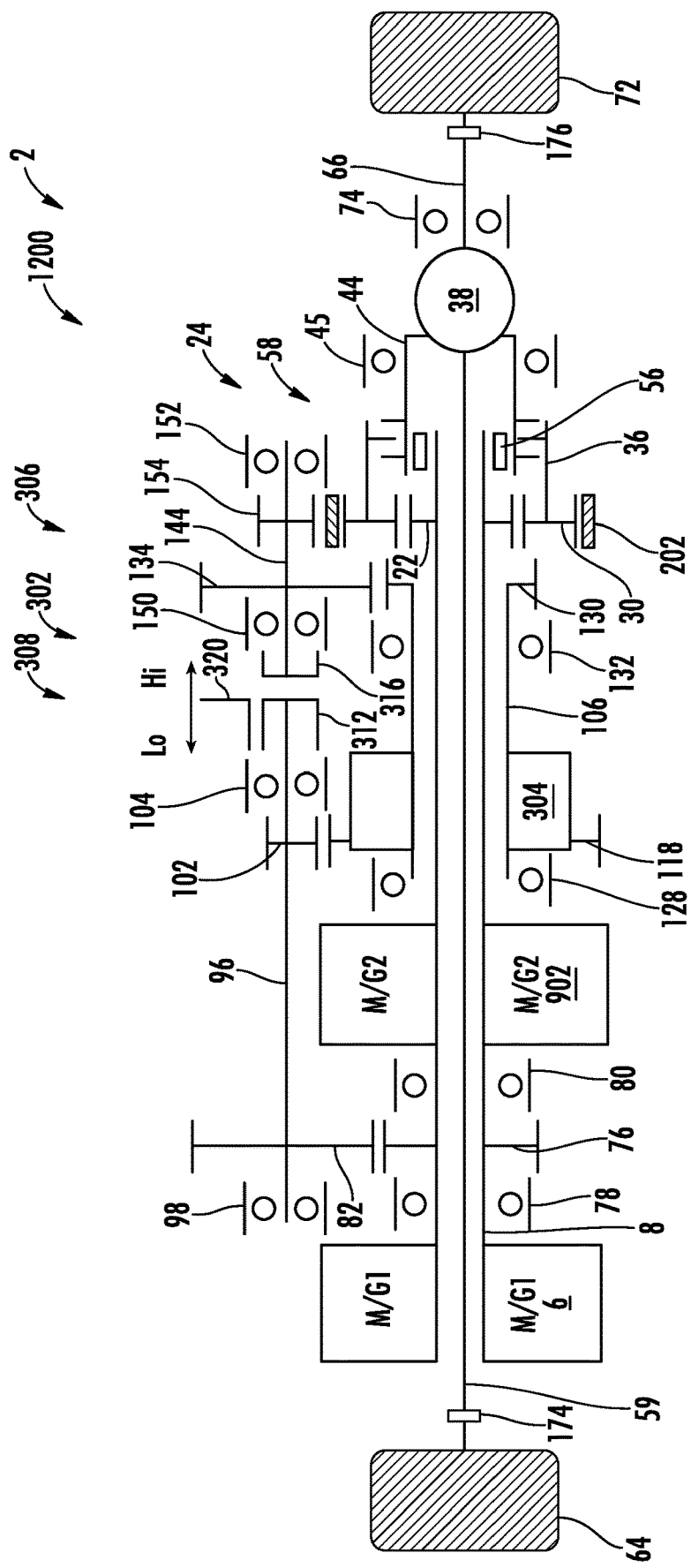
FIG. 12 is a schematic side-view of a drive unit assembly illustrated in FIG. 4 of the disclosure according to another embodiment of the disclosure.

FIG. 12 is a schematic side-view of a drive unit assembly 1200 according to another embodiment of the disclosure. The drive unit assembly 1200 illustrated in FIG. 12 is the same as the drive unit assemblies 300, 400, 900, 1000 and 1100 illustrated in FIGS. 3, 4, 9, 10 and 11, except where specifically noted below. In accordance with the embodiment illustrated in FIG. 12 of the disclosure and as a non-limiting example, the drive unit assembly 1200 may include the use of the one or more second motors 902.

Additionally, in accordance with the embodiment illustrated in FIG. 12 of the disclosure and as a non-limiting example, the drive unit assembly 1200 may include the use of the ring gear 202 described and illustrated in relation to FIGS. 2, 4, 6, 8, and 10 in order to drivingly connect the second gear assembly 306 to the planetary gear assembly 24.

It is therefore to be understood that the drive unit assembly 1200 illustrated in FIG. 12 may provide a two speed drive unit with a longitudinal motor and gear train arrangement. As a result, the drive unit assembly 1200 illustrated in FIG. 12 is able to achieve the higher and more desirable torque and/or speed ratios in a more compact and space saving arrangement making it desirable for not only future vehicle but vehicles currently on the road.

Figure 13:
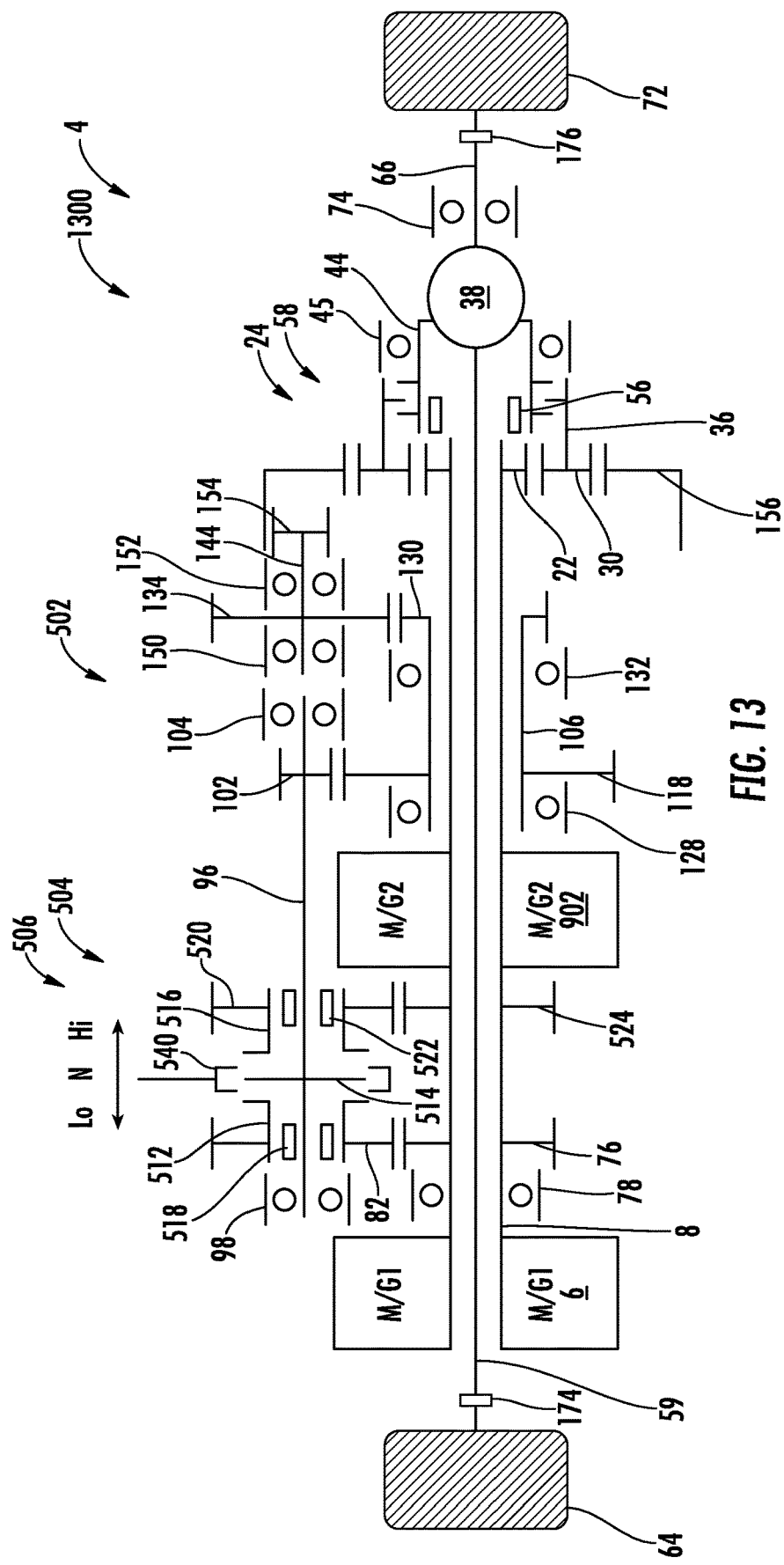
FIG. 13 is a schematic side-view of a drive unit assembly illustrated in FIGS. 5-5B of the disclosure according to another embodiment of the disclosure.

FIG. 13 is a schematic side-view of a drive unit assembly 1300 according to another embodiment of the disclosure. The drive unit assembly 1300 illustrated in FIG. 13 of the disclosure is the same as the drive unit assemblies 500, 900, 1000, 1100 and 1200 illustrated in FIGS. 5, 9, 10, 11 and 12, except where specifically noted below. In accordance with the embodiment illustrated in FIG. 13 of the disclosure and as a non-limiting example, the drive unit assembly 1300 may include the use of the one or more second motors 902 in order to provide the rotational power needed to drive the sun gear 22 of the planetary gear assembly 24, the first gear 76 of the second gear assembly 502 and/or the ninth gear 524 of the second gear assembly 502. Additionally, in accordance with the embodiment illustrated in FIG. 13 of the disclosure and as a non-limiting example, the drive unit assembly 1300 may include the use of the ring gear 156 described and illustrated in relation to FIGS. 1, 3, 5, 7, 9 and 11 in order to drivingly connect the second gear assembly 502 to the planetary gear assembly 24.

It is therefore to be understood that the drive unit assembly 1300 illustrated in FIG. 13 may provide a two speed drive unit with a longitudinal motor and gear train arrangement. As a result, the drive unit assembly 1300 illustrated in FIG. 13 is able to achieve the higher and more desirable torque and/or speed ratios in a more compact and space saving arrangement making it desirable for not only future vehicle but vehicles currently on the road.

Figure 14:
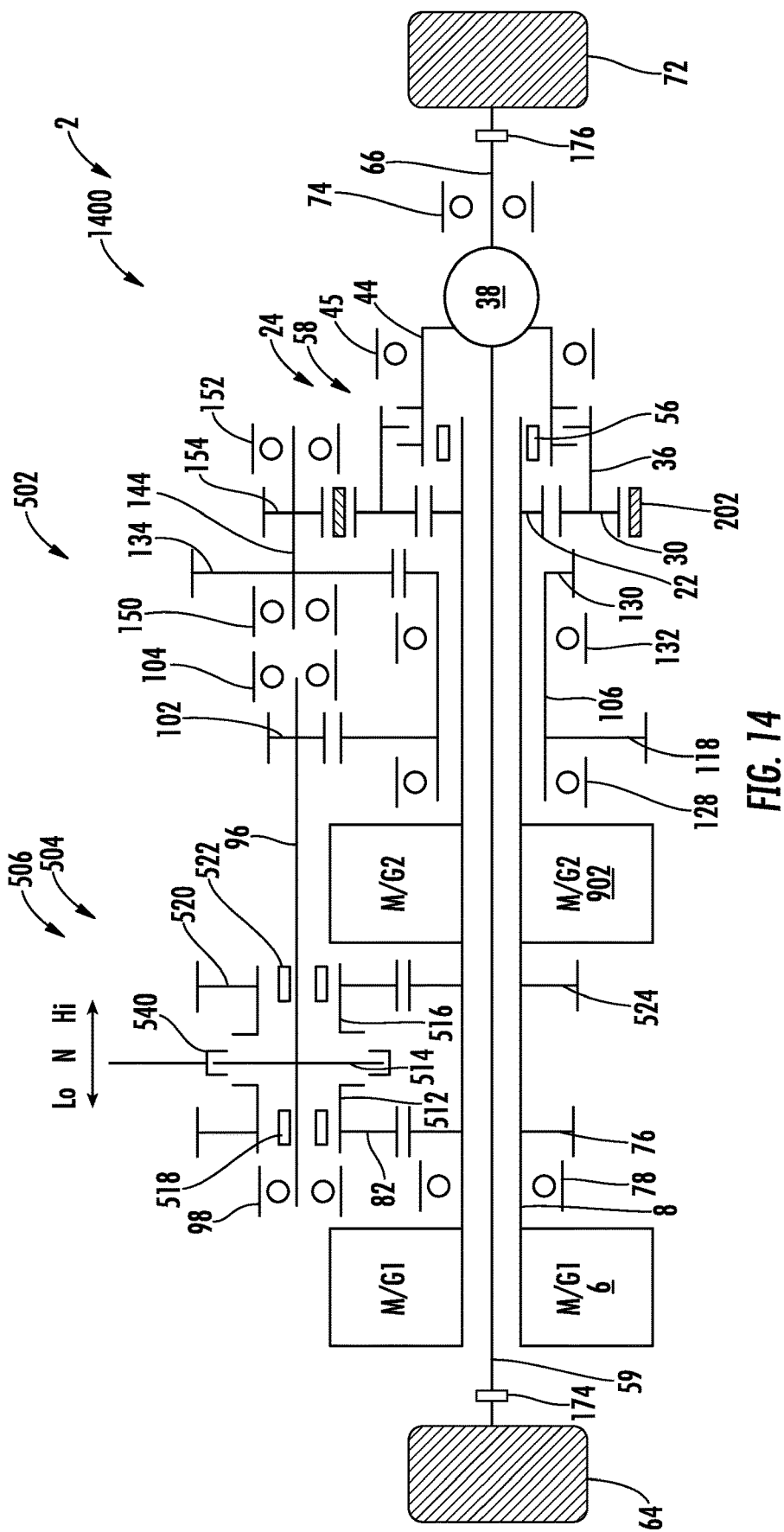
FIG. 14 is a schematic side-view of a drive unit assembly illustrated in FIG. 6 of the disclosure according to another embodiment of the disclosure.

FIG. 14 is a schematic side-view of a drive unit assembly 1400 according to another embodiment of the disclosure. The drive unit assembly 1400 illustrated in FIG. 14 is the same as the drive unit assemblies 500, 600, 900, 1000, 1100, 1200 and 1300 illustrated in FIGS. 5, 6, 9, 10, 11, 12 and 13, except where specifically noted below. In accordance with the embodiment illustrated in FIG. 14 of the disclosure and as a non-limiting example, the drive unit assembly 1400 may include the use of the one or more second motors 902 in order to provide the rotational power needed to drive the sun gear 22 of the planetary gear assembly 24, the first gear 76 of the second gear assembly 502 and/or the ninth gear 524 of the second gear assembly 502. Additionally, in accordance with the embodiment illustrated in FIG. 14 of the disclosure and as a non-limiting example, the drive unit assembly 1400 may include the use of the ring gear 202 described and illustrated in relation to FIGS. 2, 4, 6, 8, 10, and 12 in order to drivingly connect the second gear assembly 502 to the planetary gear assembly 24.

It is therefore to be understood that the drive unit assembly 1400 illustrated in FIG. 14 may provide a two speed drive unit with a longitudinal motor and gear train arrangement. As a result, the drive unit assembly 1400 illustrated in FIG. 14 is able to achieve the higher and more desirable torque and/or speed ratios in a more compact and space saving arrangement making it desirable for not only future vehicle but vehicles currently on the road.

Figure 15:
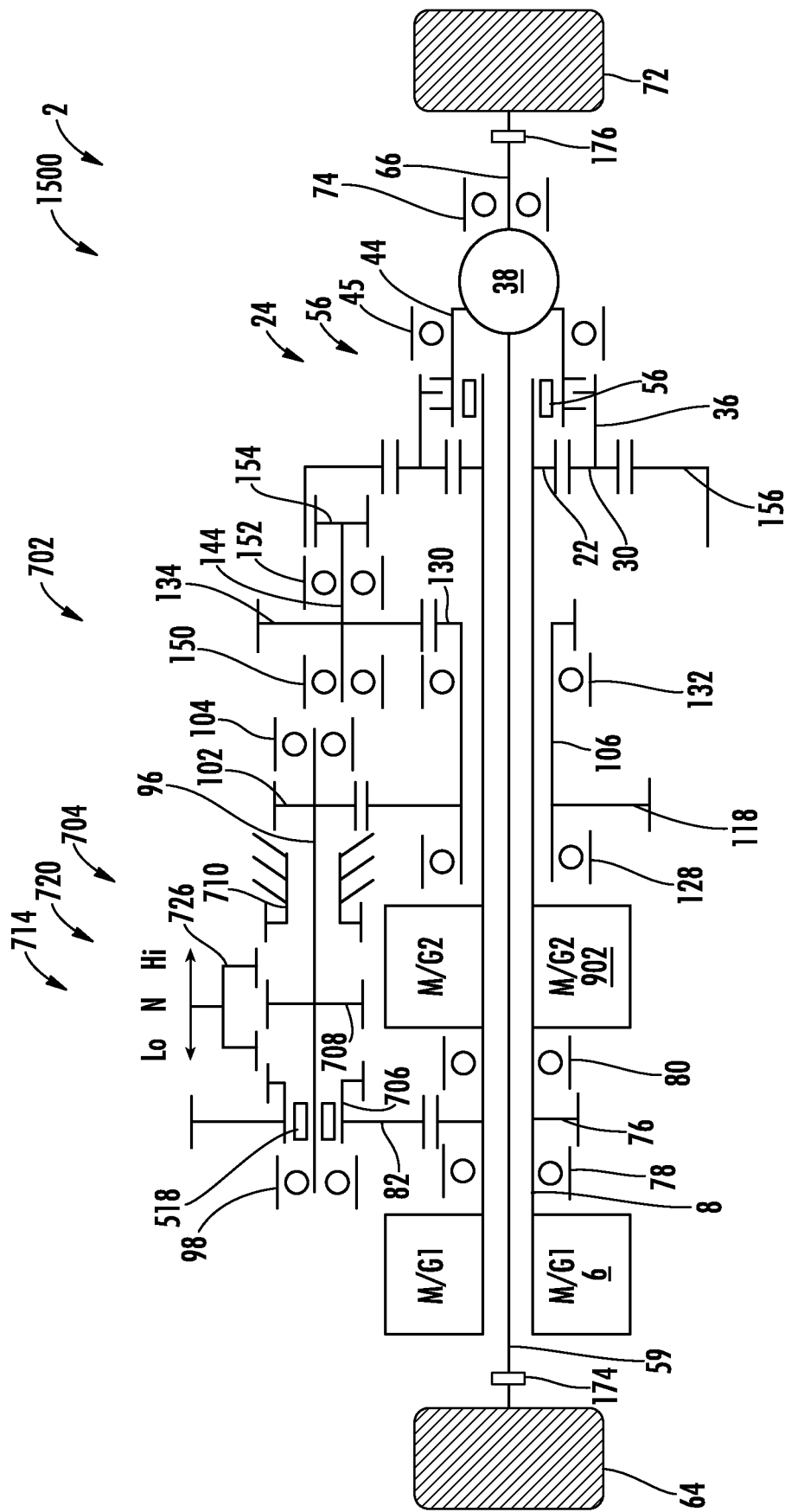
FIG. 15 is a schematic side-view of a drive unit assembly illustrated in FIGS. 7-7B of the disclosure according to another embodiment of the disclosure.

FIG. 15 is a schematic side-view of a drive unit assembly 1500 according to another embodiment of the disclosure. The drive unit assembly 1500 illustrated in FIG. 15 is the same as the drive unit assemblies 700, 900, 1000, 1100, 1200, 1300 and 1400 illustrated in FIGS. 7, 9, 10, 11, 12, 13 and 14, except where specifically noted below. In accordance with the embodiment illustrated in FIG. 15 of the disclosure and as a non-limiting example, the drive unit assembly 1500 may include the use of the one or more second motors 902 in order to provide the rotational power needed to drive the sun gear 22 of the planetary gear assembly 24 and/or the first gear 76 of the second gear assembly 702. Additionally, in accordance with the embodiment illustrated in FIG. 15 of the disclosure and as a non-limiting example, the drive unit assembly 1500 may include the use of the ring gear 156 described and illustrated in relation to FIGS. 1, 3, 5, 7, 9, 11, and 13 in order to drivingly connect the second gear assembly 702 to the planetary gear assembly 24.

It is therefore to be understood that the drive unit assembly 1500 illustrated in FIG. 15 may provide a two speed drive unit with a longitudinal motor and gear train arrangement. As a result, the drive unit assembly 1500 illustrated in FIG. 15 is able to achieve the higher and more desirable torque and/or speed ratios in a more compact and space saving arrangement making it desirable for not only future vehicle but vehicles currently on the road.

Figure 16:
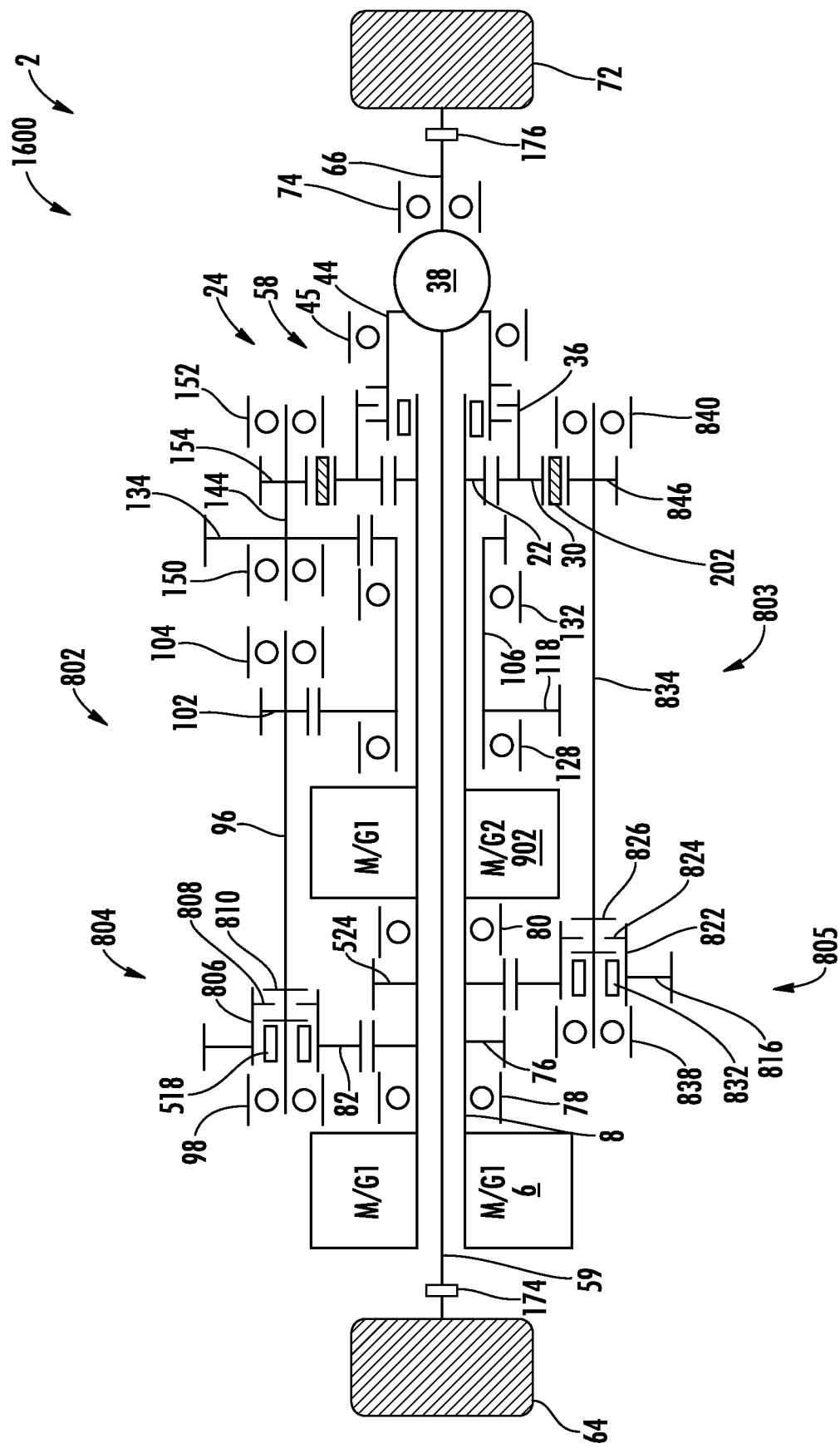
FIG. 16 is a schematic side-view of a drive unit assembly illustrated in FIG. 8 of the disclosure according to another embodiment of the disclosure.

FIG. 16 is a schematic side-view of a drive unit assembly 1600 according to another embodiment of the disclosure. The drive unit assembly 1600 illustrated in FIG. 16 is the same as the drive unit assemblies 800, 900, 1000, 1100, 1200, 1300, 1400 and 1500 illustrated in FIGS. 8, 9, 10, 11, 12, 13, 14 and 15, except where specifically noted below. In accordance with the embodiment illustrated in FIG. 16 of the disclosure and as a non-limiting example, the drive unit assembly 1600 may include the use of the one or more second motors 902 in order to provide the rotational power needed to drive the sun gear 22 of the planetary gear assembly 24, the first gear 76 of the second gear assembly 802 and the ninth gear 524 which drives the third gear assembly 803. Additionally, in accordance with the embodiment illustrated in FIG. 16 of the disclosure and as a non-limiting example, the drive unit assembly 1600 may include the use of the ring gear 202 described and illustrated in relation to FIGS. 2, 4, 6, 8, 10, 12, and 14 in order to drivingly connect the second and third gear assemblies 802 and 803 to the planetary gear assembly 24.

According to an alternative embodiment of the disclosure (not shown), the drive unit assembly 1600 may include the use of the ring gear 156 described and illustrated in relation to FIGS. 1, 3, 5, 7, 9, 11, 13 and 15 in order to drivingly connect the second and third gear assemblies 802 and 803 to the planetary gear assembly 24 of the drive unit assembly 1600.

It is therefore to be understood that the drive unit assembly 1600 illustrated in FIG. 16 provides a two speed drive unit with a longitudinal motor and gear train arrangement. As a result, the drive unit assembly 1600 illustrated in FIG. 16 is able to achieve the higher and more desirable torque and/or speed ratios in a more compact and space saving arrangement making it desirable for not only future vehicle but vehicles currently on the road.

Additionally, it is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

What is claimed is:

1. A drive unit assembly, comprising:
one or more first motors;
a first shaft having a first end portion, a second end portion, an inner surface, an outer surface and a hollow portion therein;
  wherein at least a portion of said one or more first motors are drivingly connected to at least a portion of said first end portion of said first shaft;
a planetary gear assembly comprising a sun gear, one or more planetary gears and a ring gear and a carrier;
  wherein at least a portion of said sun gear is drivingly connected to at least a portion of said second end portion of said first shaft;
  wherein at least a portion of said carrier is drivingly connected to at least a portion of said one or more planetary gears of said planetary gear assembly;
a differential assembly input member drivingly connected to at least a portion of said carrier;
a differential assembly drivingly connected to at least a portion of said differential assembly input member;
a first axle half shaft drivingly connected to at least a portion of said differential assembly and at least partially disposed within said hollow portion of said first shaft;
a second axle half shaft drivingly connected to at least a portion of said differential assembly;
an axle connect and disconnect device;
  wherein at least a portion of said axle connect and disconnect device is integrally connected to said carrier of said planetary gear assembly and said differential assembly input member; and
  wherein said axle connect and disconnect device selectively connects and disconnects said differential assembly from driving engagement with said one or more motors.

2. The drive unit assembly of claim 1, further comprising a second gear assembly comprising a first gear, a second gear, a third gear, a fourth gear, a fifth gear, a sixth gear, a seventh gear assembly, a second shaft, a third shaft and a fourth shaft;
  wherein at least a portion of said first gear is drivingly connected to at least a portion of said first shaft;
  wherein at least a portion of said second and third gears are drivingly connected to at least a portion of said second shaft;
  wherein at least a portion of said fourth and fifth gears are drivingly connected to at least a portion of said third shaft;
  wherein at least a portion of said sixth and seventh gears are drivingly connected to at least a portion of said fourth shaft;
  wherein at least a portion of said first gear is drivingly connected to said second gear, at least a portion of said third gear is drivingly connected to said fourth gear, at least a portion of said fifth gear is drivingly connected to said sixth gear, and at least a portion of said seventh gear is drivingly connected to a first plurality of ring gear teeth of said ring gear.

3. The drive unit assembly of claim 2, further comprising a selector clutch assembly;

wherein a plurality of second shaft splines circumferentially extend from at least a portion of an outer surface of a second end portion of said second shaft;

wherein a plurality of fourth shaft splines circumferentially extend from at least a portion of a first end portion of said fourth shaft;

wherein a sliding collar having an inner surface and an outer surface;

wherein a plurality of sliding collar splines circumferentially extend from at least a portion of said inner surface of said sliding collar; and wherein said plurality of sliding collar splines are complementary to and selectively engagable with said plurality of second shaft splines and said plurality of fourth shaft splines.

4. The drive unit assembly of claim 3, wherein said selector clutch assembly has a first position and a second position;

wherein when said selector clutch is in said first position said plurality of sliding collar splines are meshingly engaged with said plurality of second shaft splines and not meshingly engaged with said plurality of fourth shaft splines;

wherein when said selector clutch is in said second position said plurality of sliding collar splines are meshingly engaged with said plurality of second shaft splines and said plurality of fourth shaft splines; and wherein when said selector clutch assembly is in said first position said drive unit assembly is in a low speed high torque driving mode and when said selector clutch assembly is in said second position said dive unit assembly is in a high speed low torque driving mode.

5. The drive unit assembly of claim 2, further comprising a one-way clutch; and wherein at least a portion of said one-way clutch is drivingly connected to at least a portion of said fourth gear and said third shaft of said second gear assembly.

6. The drive unit assembly of claim 2, further comprising a selector clutch assembly;

wherein said selector clutch assembly comprises a first clutch member, a second clutch member, a third clutch member and a collar;

wherein at least a portion of said second clutch member is selectively engagable with said first clutch member or said third clutch member;

wherein at least a portion of said first clutch member is integrally connected to at least a portion of said second gear of said second gear assembly;

wherein at least a portion of said second clutch member is slidingly and drivingly connected to at least a portion of said second shaft of said second gear assembly;

wherein at least a portion of said third clutch member is integrally connected to at least a portion of an eighth gear;

wherein at least a portion of said eighth gear is co-axial with said second shaft and drivingly connected to at least a portion of a ninth gear; and wherein at least a portion of said ninth gear is drivingly connected to at least a portion of said first shaft at a point between said first gear and said third shaft of said second gear assembly.

7. The drive unit assembly of claim 6, wherein said selector clutch assembly has a first position, a second position and a third position;

wherein when said selector clutch assembly is in said first position said second clutch member is drivingly disconnected from said first clutch member and said third clutch member;

wherein when said selector clutch assembly is in said second position said second clutch member is drivingly connected to at least a portion of said first clutch member and drivingly disconnected from sais third clutch member;

wherein when said selector clutch assembly is in said third position said second clutch member is drivingly connected to at least a portion of said third clutch member and drivingly disconnected from said first clutch member; and wherein when said selector clutch assembly is in said first portion said drive unit assembly in a neutral driving mode, when said selector clutch assembly is in said second position said drive unit assembly is in a low speed high torque driving mode and when said selector clutch assembly is in said third position said dive unit assembly is in a high speed low torque driving mode.

8. The drive unit assembly of claim 2, further comprising a selector clutch assembly;

wherein said selector clutch assembly includes a first clutch member, a second clutch member, a third clutch member and a collar;

wherein at least a portion of said first clutch member is integrally connected to at least a portion of said second gear;

wherein at least a portion of said second clutch member is drivingly connected to at least a portion of said second shaft at a point between said second gear and said third gear of said second gear assembly;

wherein at least a portion of said third clutch member is integrally connected to at least a portion of a housing of said drive unit assembly;

wherein an inner surface of said collar has a first engagement portion and a second engagement portion; and wherein at least a portion of said first engagement portion of said collar is selectively engagable with said first clutch member and said second clutch member and said second engagement member is selectively engagable with said second clutch member and said third clutch member.

9. The drive unit assembly of claim 8, wherein said selector clutch assembly has a first position, a second position and a third position;

wherein when said selector clutch assembly is in said first position said first engagement portion and said second engagement portion of said collar are drivingly disengaged from said first clutch member, said second clutch member and said third clutch member;

wherein when said selector clutch assembly is in said second position at least a portion of said first engagement portion of said collar is drivingly engaged with said first clutch member and at least a portion of said second engagement portion of said collar is drivingly engaged with said second clutch member;

wherein when said selector clutch is in said third position at least a portion of said first engagement portion of said collar is drivingly engaged with said second clutch member and at least a portion of said second engagement portion of said collar is drivingly engaged with said third clutch member; and wherein when said selector clutch assembly is in said first portion said drive unit assembly in a neutral driving mode, when said selector clutch assembly is in said second position said drive unit assembly is in a low speed high torque driving mode and when said selector clutch assembly is in said third position said dive unit assembly is in a high speed low torque driving mode.

10. The drive unit assembly of claim 1, further comprising a second gear assembly comprising a first gear, a second gear, a third gear, a fourth gear, fifth gear, a sixth gear, a seventh gear, a second shaft, a third shaft and fourth shaft;
  wherein at least a portion of said first gear is drivingly connected to said second gear, at least a portion of said third gear is drivingly connected to said fourth gear, at least a portion of said fifth gear is drivingly connected to said sixth gear, and at least a portion of said seventh gear is drivingly connected to said first plurality of ring gear teeth of said ring gear;
  wherein at least a portion of said first gear is drivingly connected to at least a portion of said first shaft, wherein at least a portion of said second gear is rotationally supported on said second shaft by using one or more eleventh bearing assemblies, wherein at least a portion of said third gear is drivingly connected to at least a portion of said second shaft, wherein at least a portion of said fourth and fifth gears are drivingly connected to said third shaft and wherein at least a portion of said sixth and seventh gears are drivingly connected to at least a portion of said fourth shaft;
  wherein a first selector clutch assembly selectively drivingly connects and disconnects said second gear to and from driving engagement with said second shaft;
  a third gear assembly comprising a ninth gear, a tenth gear, an eleventh gear and a fifth shaft;
  wherein at least a portion of said ninth gear is drivingly connected to at least a portion of said tenth gear and at least a portion of said eleventh gear is drivingly connected to said ring gear;
  wherein at least a portion of said ninth gear is drivingly connected to said first shaft, wherein said tenth gear is rotationally supported on said fifth shaft by one or more fourteenth bearing assemblies and wherein said eleventh gear is drivingly connected to at least a portion of said fifth shaft;
  wherein a second selector clutch assembly selectively drivingly connects and disconnects said tenth gear to and from driving engagement with said fifth shaft.

11. The drive unit assembly of claim 10, wherein when said first selector clutch assembly and said second selector clutch assembly drivingly disconnect said second and tenth gears from driving engagement with said second and tenth shafts said drive unit assembly is neutral driving mode;
  wherein when said first selector clutch assembly drivingly connects said second gear to said second shaft and said second selector clutch assembly drivingly disconnects said tenth gear from driving engagement with said fifth shaft said drive unit assembly is in a low speed high torque driving mode; and
  wherein when said first selector clutch assembly disconnects said second gear from driving engagement with said second shaft and said second selector clutch assembly drivingly connects said tenth gear to said fifth shaft said drive unit assembly is in a high speed low torque driving mode.

12. The drive unit assembly of claim 2, further comprising one or more second motors; and
  wherein at least a portion of said one or more second motors are drivingly connected to at least a portion of said first shaft at a point between said first gear and said third shaft of said second gear assembly.

13. The drive unit assembly of claim 1, wherein said one or more first motors act as a generator.

14. The drive unit assembly of claim 12, wherein said one or more second motors may act as a generator.

15. The drive unit assembly of claim 1, wherein the portion of said axle connect and disconnect device is integrally connected to said carrier of said planetary gear assembly and said differential assembly input member by using at least one of: one or more mechanical fasteners, one or more welds, one or more adhesives, a splined connection, and a threaded connection.

16. A drive unit assembly, comprising:
  one or more first motors;
  a first shaft having a first end portion, a second end portion, an inner surface, an outer surface and a hollow portion therein;
    wherein at least a portion of said one or more first motors are drivingly connected to at least a portion of said first end portion of said first shaft;
  a planetary gear assembly comprising a sun gear, one or more planetary gears and a ring gear and a carrier;
    wherein at least a portion of said sun gear is drivingly connected to at least a portion of said second end portion of said first shaft;
    wherein at least a portion of said carrier is drivingly connected to at least a portion of said one or more planetary gears of said planetary gear assembly;
  a differential assembly input member drivingly connected to at least a portion of said carrier;
  a differential assembly drivingly connected to at least a portion of said differential assembly input member;
  a first axle half shaft drivingly connected to at least a portion of said differential assembly and at least partially disposed within said hollow portion of said first shaft;
  a second axle half shaft drivingly connected to at least a portion of said differential assembly;
  an axle connect and disconnect device;
    wherein at least a portion of said axle connect and disconnect device is integrally connected to said carrier of said planetary gear assembly and said differential assembly input member; and
    wherein said axle connect and disconnect device selectively connects and disconnects said differential assembly from driving engagement with said one or more motors;
  wherein said ring gear has a first inner surface, a second inner surface and an outer surface;
  wherein a first plurality of ring gear teeth circumferentially extend from at least a portion of said first inner surface of said ring gear and a second plurality of ring gear teeth circumferentially extend from at least a portion of said second inner surface of said ring gear; and
  wherein said second plurality of ring gear teeth are meshingly engaged with a plurality of planetary gear teeth circumferentially extending from at least a portion of an outer surface of said one or more planetary gears.

17. The drive unit assembly of claim 16, wherein said first inner surface of said ring gear has a diameter that is greater than a diameter of said second inner surface of said ring gear.

18. A drive unit assembly, comprising:
  one or more first motors;
  a first shaft having a first end portion, a second end portion, an inner surface, an outer surface and a hollow portion therein;

wherein at least a portion of said one or more first motors are drivingly connected to at least a portion of said first end portion of said first shaft;
a planetary gear assembly comprising a sun gear, one or more planetary gears and a ring gear and a carrier;
wherein at least a portion of said sun gear is drivingly connected to at least a portion of said second end portion of said first shaft;
wherein at least a portion of said carrier is drivingly connected to at least a portion of said one or more planetary gears of said planetary gear assembly;
a differential assembly input member drivingly connected to at least a portion of said carrier;
a differential assembly drivingly connected to at least a portion of said differential assembly input member;
a first axle half shaft drivingly connected to at least a portion of said differential assembly and at least partially disposed within said hollow portion of said first shaft;
a second axle half shaft drivingly connected to at least a portion of said differential assembly;
an axle connect and disconnect device;
wherein at least a portion of said axle connect and disconnect device is integrally connected to said carrier of said planetary gear assembly and said differential assembly input member; and
wherein said axle connect and disconnect device selectively connects and disconnects said differential assembly from driving engagement with said one or more motors;
wherein said ring gear has an inner surface and an outer surface;
wherein a first plurality of ring gear teeth circumferentially extend from at least a portion of said outer surface of said ring gear; and
wherein a second plurality of ring gear teeth circumferentially extend from at least a portion of said inner surface of said ring gear.

* * * * *